US007213992B2

(12) United States Patent
Meyerhofer

(10) Patent No.: US 7,213,992 B2
(45) Date of Patent: May 8, 2007

(54) REWRITABLE CARD PRINTER

(75) Inventor: Eric Meyerhofer, Pasadena, CA (US)

(73) Assignee: FutureLogic, Inc., Glendale, CA (US)

( * ) Notice: Subject to any disclaimer, the term of this patent is extended or adjusted under 35 U.S.C. 154(b) by 2 days.

(21) Appl. No.: 11/258,063

(22) Filed: Oct. 26, 2005

(65) Prior Publication Data

US 2006/0104697 A1    May 18, 2006

(51) Int. Cl.
*B41J 13/12*    (2006.01)
(52) U.S. Cl. ................. 400/521; 400/531; 400/536
(58) Field of Classification Search ............. 400/521, 400/531, 536
See application file for complete search history.

(56) References Cited

U.S. PATENT DOCUMENTS

| 5,326,179 | A | 7/1994 | Fukai et al. ............... 400/521 |
| 5,448,284 | A | 9/1995 | Matsuda et al. ........... 347/221 |
| 5,714,743 | A | 2/1998 | Chiba et al. .............. 235/449 |
| 5,768,143 | A | 6/1998 | Fujimoto .................. 700/235 |
| 6,030,474 | A | 2/2000 | Isono et al. ............... 156/64 |
| 6,152,620 | A | 11/2000 | Ozawa et al. ........... 400/120.01 |
| 6,230,973 | B1 | 5/2001 | Fukui et al. .............. 235/449 |
| 6,543,685 | B1 | 4/2003 | Lien et al. ................ 235/380 |
| 6,694,884 | B2 | 2/2004 | Klinefelter et al. ......... 101/484 |
| 6,729,719 | B2 | 5/2004 | Klinefelter et al. ......... 347/101 |

FOREIGN PATENT DOCUMENTS

JP    62089167 A    4/1987

*Primary Examiner*—Minh Chau
(74) *Attorney, Agent, or Firm*—Fitzpatrick, Cella, Harper & Scinto

(57) ABSTRACT

A rewritable card printer useful as a rewritable card printer. The rewritable card printer includes a print module coupled to one or more separate card magazines, each having independent card drives. The operation of the print module and one or more card magazines are controlled by a printer controller. Cards may be exchanged between multiple card magazines so that cards can be escrowed, exchanged, or selectively located and retrieved. The print module may receive as well as dispense cards from and to an external card source so that the card magazines may be replenished without opening up a gaming machine hosting the rewritable card printer. The print module may further include a security device reader that is used to read security features embedded in the cards. The security features may be used to track individual card use and to guard against card duplication and fraud.

21 Claims, 22 Drawing Sheets

REWRITABLE CARD PRINTER

CROSS-REFERENCE TO RELATED APPLICATION

This application is a continuation-in-part of U.S. application Ser. No. 10/654,521, filed Sep. 2, 2003, now allowed, and is related to U.S. patent application entitled "PAPER MOTION DETECTOR IN A GAMING MACHINE", attorney docket number 50820/FLC/F392 filed Aug. 12, 2003, U.S. patent application Ser. No. 10/618,811 filed Jul. 9, 2003, and U.S. patent application Ser. No. 10/136,897, filed Apr. 30, 2002, the contents of each of which are hereby incorporated by reference as if stated herein in full.

BACKGROUND OF THE INVENTION

This invention relates generally to gaming printers and more specifically to printers for use in cashless gaming machines that use rewritable cards.

The gaming machine manufacturing industry provides a variety of gaming machines for the amusement of gaming machine players. An exemplary gaming machine is a slot machine. A slot machine is an electro-mechanical game wherein chance or the skill of a player determines the outcome of the game. Slot machines are usually found in casinos or other more informal gaming establishments.

Gaming machine manufacturers have more recently introduced cashless enabled games to the market and these have begun to find wide acceptance in the gaming industry. Cashless enabled games are so named because they can conduct financial exchanges using a mixture of traditional currencies and rewritable cards. Typically, a cashless enabled game has a gaming printer to produce rewritable cards and a rewritable card reader that supports automatic reading of rewritable cards. To coordinate the activities of multiple cashless enabled games, one or more cashless enabled games may be electronically coupled to a cashless enabled game system that controls the cashless operations of a cashless enabled game.

When a player cashes out using a cashless enabled game coupled to a cashless enabled game system, the cashless enabled game signals the system and the system may determine the type of pay out presented to the player. Depending on the size of the pay out, the cashless enabled game system may cause the cashless enabled game to present coins in the traditional method of a slot machine, or the cashless enabled game system may cause a gaming printer in the cashless enabled game to produce a rewritable card for the value of the pay out. The rewritable card may then be redeemed in a variety of ways. For example, the rewritable card may be redeemed for cash at a cashier's cage or used with another cashless enabled game. In order to use the rewritable card in a cashless enabled game, the rewritable card is inserted into a rewritable card reader of another cashless enabled game at a participating casino and the cashless enabled game system recognizes the rewritable card, redeems the rewritable card, and places an appropriate amount of playing credits on the cashless enabled game.

Cashless enabled games have found an increasing acceptance and use in the gaming industry, both with players who enjoy the speed of play and ease of transporting their winnings around the casino and casinos who have realized significant labor savings in the form of reduced coin hopper reloads in the games, and an increase in revenue because of the speed of play. Practical field experience with printers used in cashless enabled games has illustrated that there are areas for improvement in the current printer designs and implementation. These areas in need of improvement include methods and means for using rewritable card media for printing of vouchers.

SUMMARY OF THE INVENTION

A rewritable card printer useful as a gaming machine printer for printing vouchers is provided. The rewritable card printer includes a print module coupled to one or more separate card magazines, each having independent card drives. The operations of the print module and one or more card magazines is controlled by a printer controller. Cards may be exchanged between multiple card magazines so that cards can be escrowed, exchanged, or selectively located and retrieved. The print module may receive as well as dispense cards from and to an external card source so that the card magazines may be replenished without opening up a gaming machine hosting the rewritable card printer. The print module may further include a security device reader that is used to read security features embedded in the cards. The security features may be used to track individual card use and to guard against card duplication and fraud.

In another aspect of the invention, a rewritable card printer includes a print module having a print card drive and a print head with the print module mechanically coupled to a base. The rewritable card printer further includes a card magazine having a card storage location and a magazine card drive with the card magazine coupled to the base such that the magazine card drive and the print card drive may exchange cards. The rewritable card printer a printer controller electronically coupled to the print module and the card magazine. The printer controller includes a processor and a memory coupled to the processor. The memory has program instructions stored therein, the program instructions for operation by the printer controller of the print module and the card magazine.

In another aspect of the invention, the program instructions further include receiving card information for printing onto a card, generating printable indicia using the card information, and printing onto a rewritable card the printable indicia using the print head.

In another aspect of the invention, the rewritable card printer further includes an erase head with the program instructions further including instructions for erasing the rewritable card using the erase head.

In another aspect of the invention, the rewritable card printer further includes a security feature reader, the program instructions further including reading a security signature from the rewritable card using the security feature reader.

In another aspect of the invention, the rewritable card printer may be removably coupled to an external card magazine for dispensing and receiving cards.

In another aspect of the invention, the rewritable card printer may be programmed using a rewritable card or an external controller.

In another aspect of the invention, the rewritable card printer further includes encryption/decryption means coupled to the printer controller.

In another aspect of the invention, the rewritable card printer further includes a display device coupled to the printer controller.

In another aspect of the invention, the rewritable card printer further includes a card cleaning device coupled to the input module.

In another aspect of the invention, the input module further includes a magnetic strip read/write head.

In another aspect of the invention, the input module further includes an optical scanning device.

In another aspect of the invention, the input module further includes means for coupling to a static memory in a rewritable card.

In another aspect of the invention, the program instructions further include: receiving a card for storage; reading card information from the card; erasing the card; storing the card information in a static memory; and storing the card in the card magazine.

In another aspect of the invention, the card magazine further includes the static memory for storage of the card information.

In another aspect of the invention, the base is slidably coupled to a base plate fixedly coupled to a gaming machine.

In another aspect of the invention, the card magazine is slidably coupled to the base.

In another aspect of the invention, the print module is removably coupled to the base by mechanical quick disconnect means and removably coupled to the printer controller by electrical quick disconnect means.

In another aspect of the invention, the card magazine is removably coupled to the base by mechanical quick disconnect means and removably coupled to the printer controller by electrical quick disconnect means.

In another aspect of the invention, the rewritable card further comprises a second card magazine coupled to the base such that the second card magazine's magazine card drive is in communication with the first of the card magazine's magazine card drive.

In another aspect of the invention, the program instructions further include: receiving a request for a card located in the first card magazine; determining the location of the requested card located in the first card magazine; and moving cards from the first card magazine to the second card magazine until the location of the requested card is reached.

In another aspect of the invention, the rewritable card printer further includes an additional card magazine coupled to the base such that the second card magazine's magazine card drive is in communication with the print module's print card drive.

In another aspect of the invention, the program instructions further include instructions for escrowing a card or exchanging a card for another card.

In another aspect of the invention, the print module further includes an embossing detector.

In another aspect of the invention, the printer includes read and write heads for a reading and writing vouchers or coupons on write-once media such as thermal paper.

In another aspect of the invention, the printer monitors card usage in order to adjust the number of cards stored in a card magazine controlled by the printer.

In another aspect of the invention, a rewritable card printer, having a card magazine and a printer controller operably coupled to the card magazine, adjusts the number of cards in a card magazine on a basis of the number of cards currently in the card magazine and a number of cards previously in the card magazine.

In another aspect of the invention, the printer controller records an adjusted number of cards, wherein during a subsequent servicing session, adjusting the number of cards in the card magazine is further on a basis of the adjusted number of cards. In addition, the adjusted number of cards may be recorded for a plurality of servicing sessions.

In another aspect of the invention, a rewritable card printer, having a card magazine and a printer controller operably coupled to the card magazine, has the printer controller adapted to adjust a number of cards held in the card magazine on the basis of card usage by the rewritable card printer.

In another aspect of the invention, a rewritable card printer has a print module for manipulating a rewritable card, which further includes the means to write to write-once only media.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
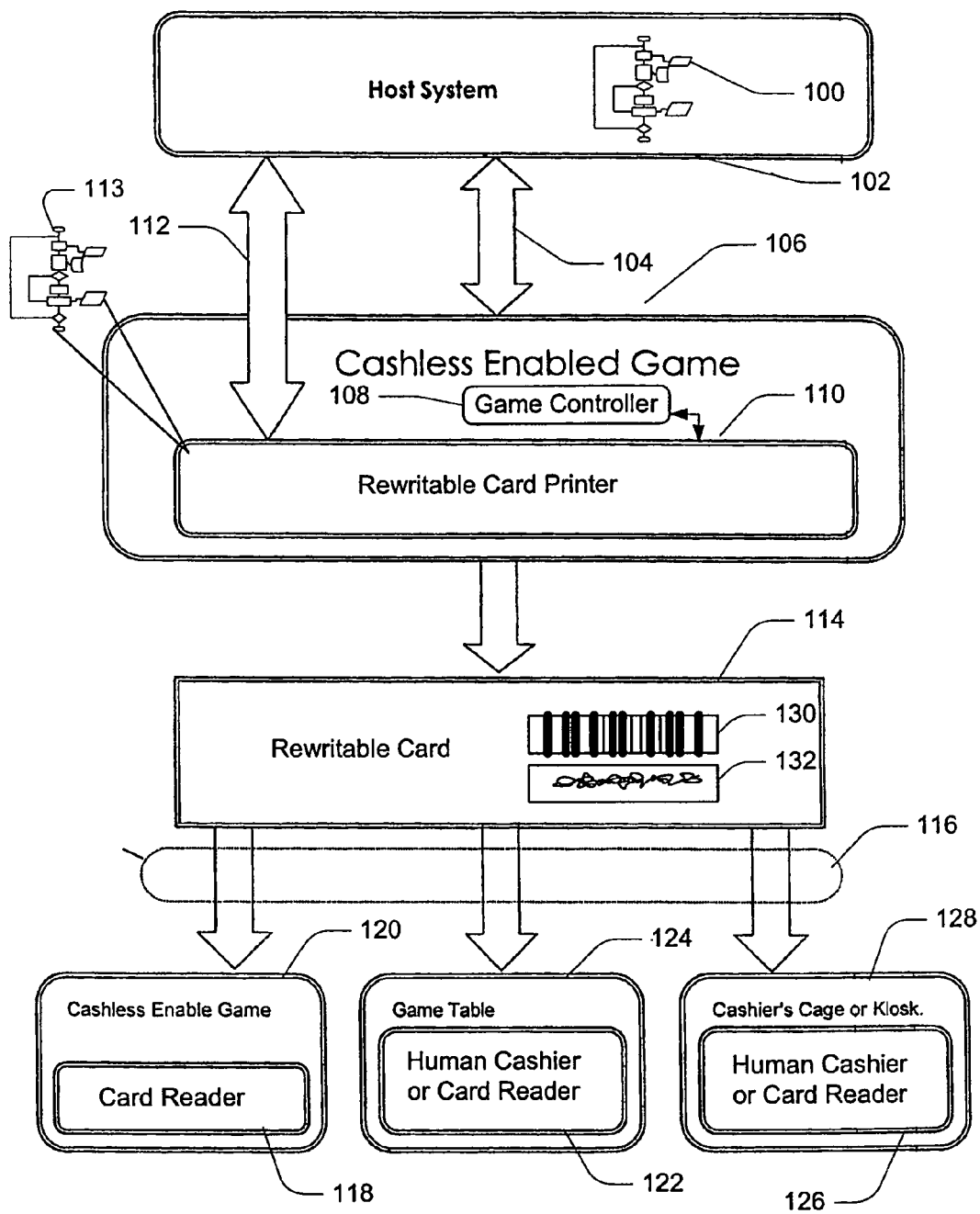
FIG. 1 is a block diagram of a cashless gaming machine and system in accordance with an exemplary embodiment of the present invention.

FIG. 1 is a block diagram of a cashless enabled gaming machine coupled to a rewritable card printer in accordance with an exemplary embodiment of the present invention. A cashless gaming system includes a cashless gaming system controller 100 hosted by a system host 102 coupled 104 to one or more cashless enabled games 106. A cashless enabled game includes a game controller 108 that controls the operation of the cashless enabled game. The game controller is coupled to a rewritable card printer 110. The cashless enabled game uses the rewritable card printer to write rewritable card media such as rewritable card 114. The rewritable card printer includes card identification and printing algorithms 113 used in conjunction with rewritable cards. The rewritable card includes the cash-out information for a player.

The rewritable card printer may also be coupled (112) to the host system and cashless gaming controller. The rewritable card may be redeemed (116) in a variety of ways.

The rewritable card may be redeemed by a human cashier or card reader 122 at a game table 124, or a human cashier or card reader 126 at a cashier's cage or kiosk 128, or by a card reader 118 at another cashless enabled game 120.

Redemption is only possible after the rewritable card passes a verification of account information 130 and validation using security features 132 included in the rewritable card.

Figure 2A:
FIG. 2a is an illustration of a rewritable card in accordance with an exemplary embodiment of the present invention.

FIG. 2a is an illustration of a rewritable card in accordance with an exemplary embodiment of the present invention. The rewritable card shown is produced from commands issued by the cashless enabled game to the gaming printer in response to a player's request to cash-out. The rewritable card 114 includes features such as a validation 35 number, printed in both a human readable form such as a character string 200 and in a machine-readable form such as a bar code 202, time and date stamps 204, cash-out amount 206, casino location information 208, cashless enabled game identifier 210, and an indication of an expiration date 212. Included in the card is a security feature 132 that may take one or more forms as discussed below.

In one rewriteable card media in accordance with an exemplary embodiment of the present invention, one face of the rewriteable card includes a layer of writable and erasable thermally sensitive film. The thermal film becomes opaque at one temperature level but becomes transparent at another temperature. This effect can be used to create a thermally rewritable card.

Figure 2B:
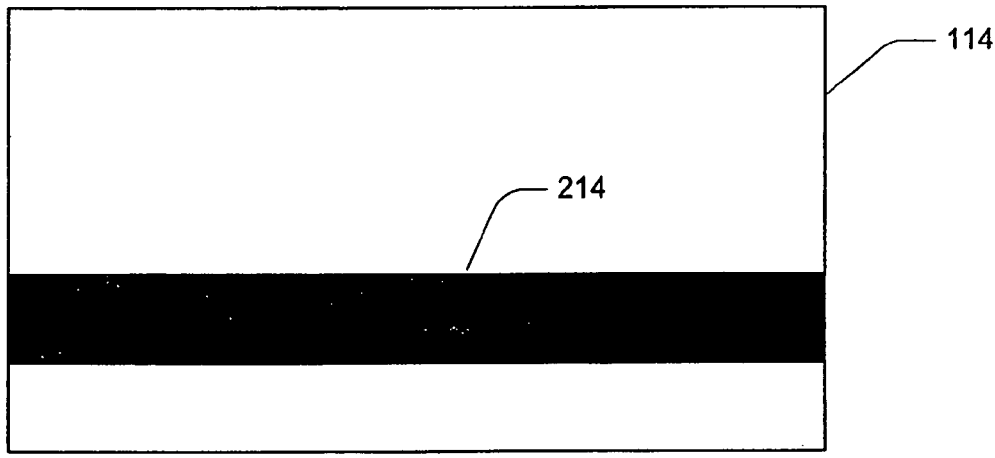
FIG. 2b is an illustration of another portion of a rewritable card in accordance with an exemplary embodiment of the present invention.

FIG. 2b is an illustration of another side of a rewriteable card in accordance with an exemplary embodiment of the present invention. The rewriteable card 114 may also include a read/write magnetic strip 214 for encoding of any of the information described above.

In addition, the magnetic strip may be used to transmit information to the rewritable card printer. For example, the magnetic strip may encode instructions such as configuration flags or programming instructions used to reconfigure or reprogram a rewritable card printer.

Figure 2C:
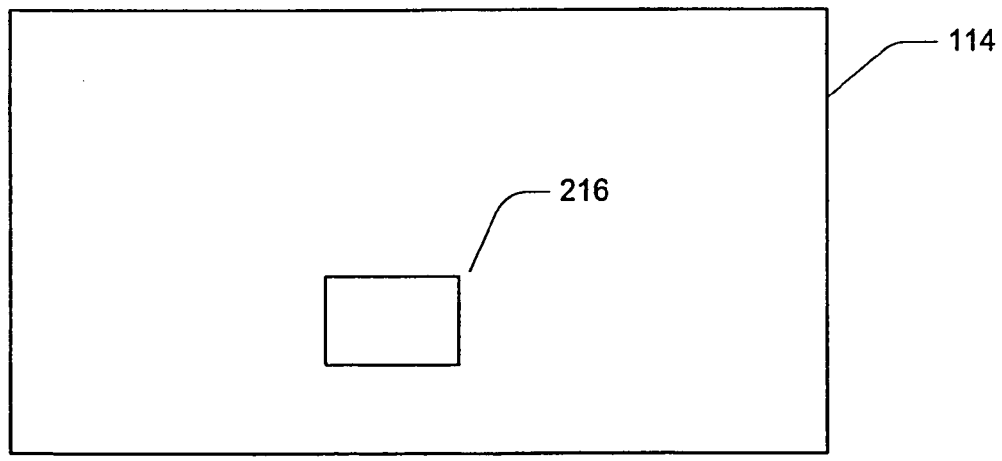
FIG. 2c is an illustration of another portion of a rewritable card having a static memory in accordance with an exemplary embodiment of the present invention.

FIG. 2c is an illustration of another portion of a rewriteable card having a static memory in accordance with an exemplary embodiment of the present invention. The rewriteable card 114 may also include a static memory 216 embedded in the rewritable card so that the rewritable card can be used as a "smart" card for encoding of any of the information described above.

In addition, the static memory may be used to transmit information to the rewritable card printer. For example, the static memory may encode instructions such as configuration flags or programming instructions used to reconfigure or reprogram a rewritable card printer.

Figure 3:
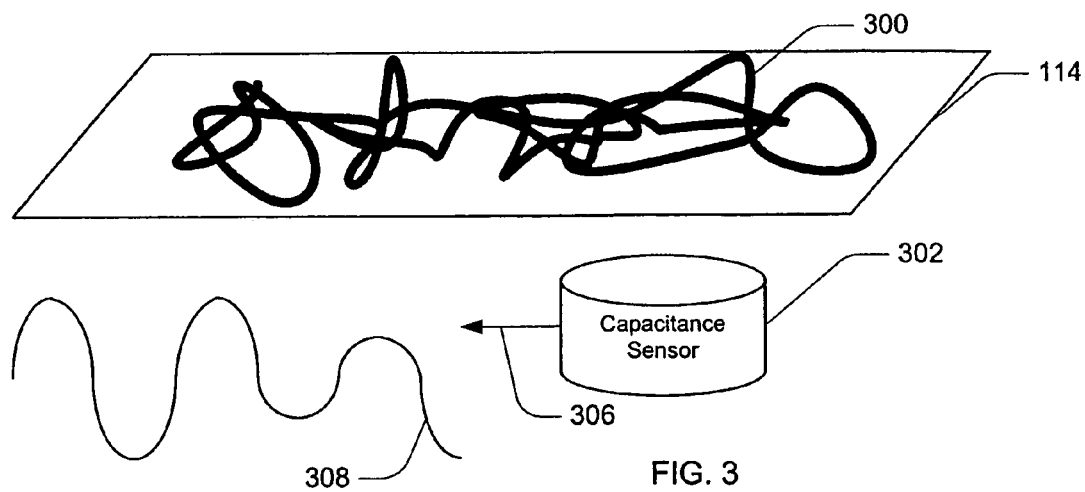
FIG. 3 is a block diagram illustrating a security feature employing capacitive inks in accordance with an exemplary embodiment of the present invention.

FIG. 3 is a block diagram illustrating a security feature employing capacitive inks in accordance with an exemplary embodiment of the present invention. A rewritable card 114 may be imprinted with metallic inks to create one or more capacitors in the rewriteable card. The one or more capacitors may be used to create a security feature in the form of a capacitor structure 300 whose capacitance may be detected by a capacitance sensor 302 coupled to the rewritable card. As the card moves across the sensor (as indicated by arrow 304) the sensor senses changes in the localized capacitance of the card and generates (306) a security signature signal 308 corresponding to the structure of the capacitor structure 300 in the rewritable card. This security signature signal may be used to identify each rewritable card used in a cashless enabled gaming system.

Figure 4:
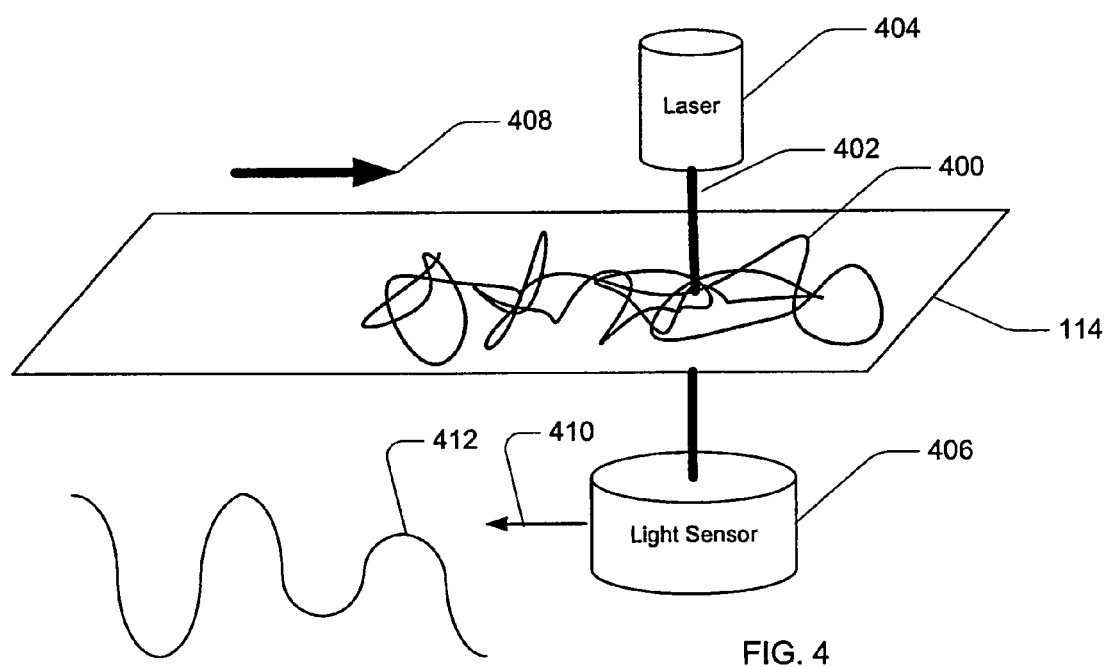
FIG. 4 is a block diagram of a security feature utilizing an optical signature in accordance with an exemplary embodiment of the present invention.

FIG. 4 is a block diagram of a security feature utilizing an optical signature in accordance with an exemplary embodiment of the present invention. To use this security feature, a rewritable card 114 includes a structure 400 having a variable optical density or optical reflectivity that is not apparent under normal lighting conditions. However, when a high intensity light, such as a laser beam 402 generated by a laser diode 404 or other laser beam generating device, is transmitted through the rewritable card, a light sensor 406 may detect fluctuations in the intensity of the transmitted or reflected laser beam caused by the structure. If the card is moved past the laser beam (as indicated by arrow 408) the moving structure generates a changing light signal that is received by the light sensor. In response to the changing light signal, the light sensor generates (410) a time varying security signature signal 412 that may be used as a signature to uniquely identify each rewritable card used in a cashless gaming system.

Figure 5:
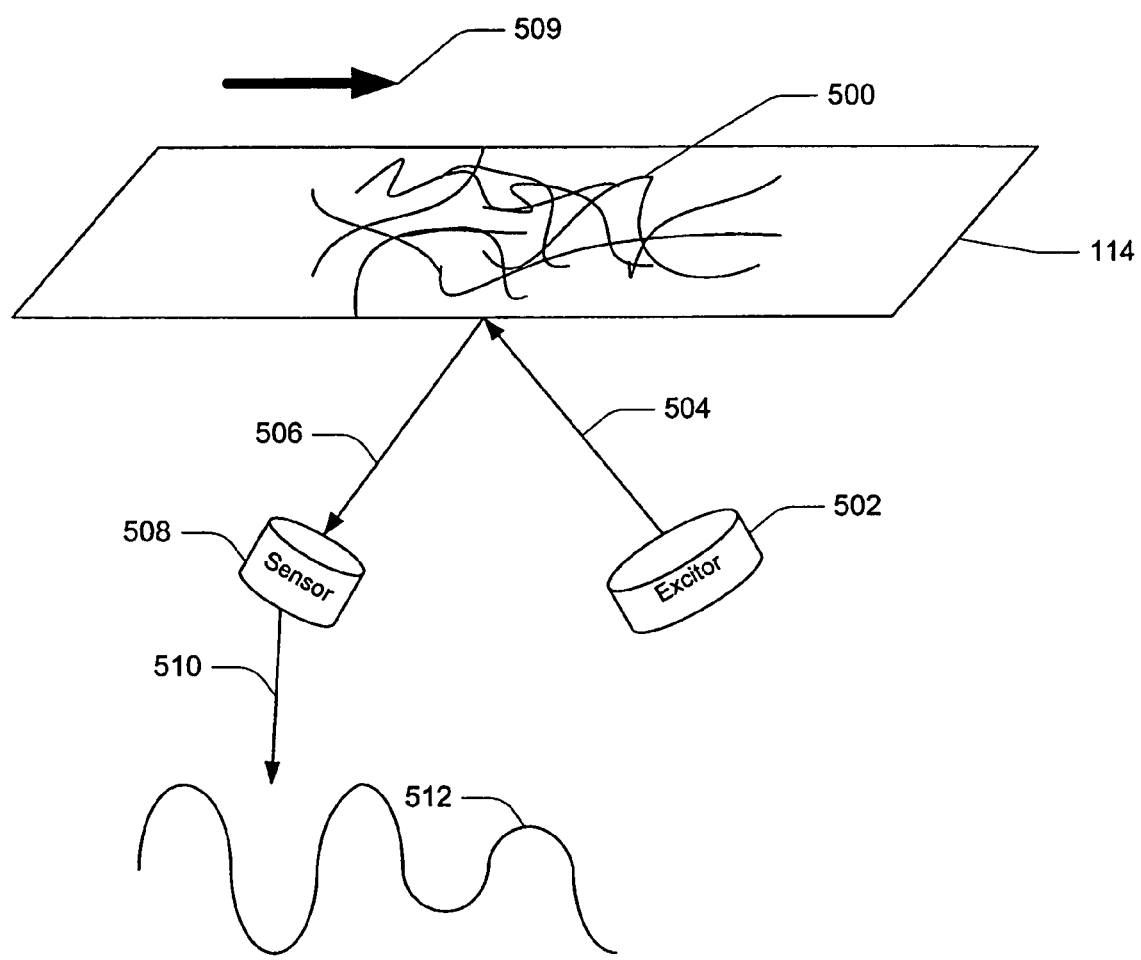
FIG. 5 is a block diagram of a security feature using randomly deposited radio sensitive fibers embedded in a rewritable card in accordance with an exemplary embodiment of the present invention.

FIG. 5 is a block diagram of a security feature using randomly deposited radio sensitive fibers or inks embedded in a rewritable card in accordance with an exemplary embodiment of the present invention. A rewritable card 114 may include a layer of randomly deposited radio sensitive fibers 500 embedded within the card. An excitor 502 is used to transmit short pulses of radio waves 504 into the layer of fibers. In response to the radio waves, the fibers generate a resultant radio frequency signal 506 that may be detected by a sensor 508. If the rewritable card is moving (as indicated by direction arrow 509) as the fibers are being excited, the sensor receives a time varying radio frequency signal generated by the excited and moving fibers. In response to the time varying radio frequency signal, the sensor generates (510) a time varying security signature signal 512 that may be used to uniquely identify each rewritable card in a cashless gaming system.

Figure 6:
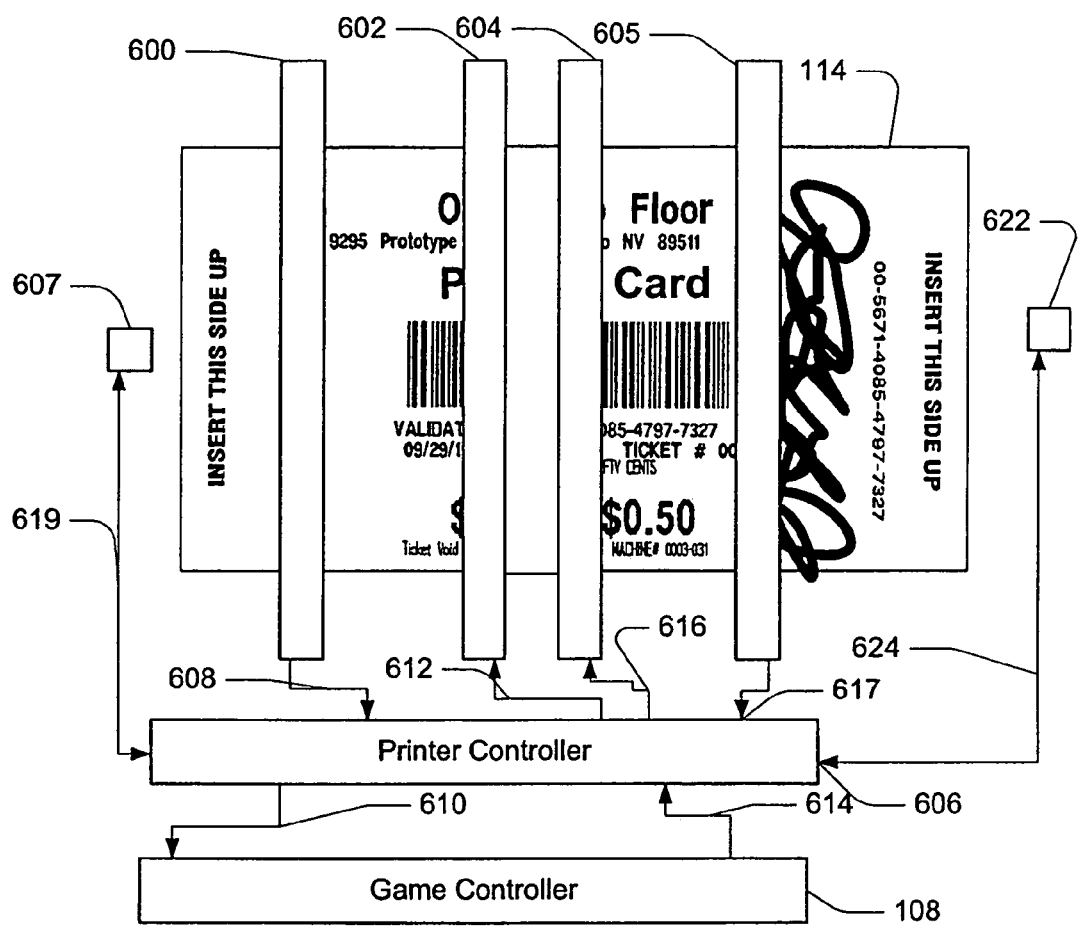
FIG. 6 is a block diagram of the operation of a rewritable card printer in accordance with an exemplary embodiment of the present invention.

FIG. 6 is a block diagram of the operation of a rewritable card printer in accordance with an exemplary embodiment of the present invention. A rewritable card printer includes a security feature reader 600 for reading a security feature embedded in a rewritable card 114. The type of security feature reader is dependent on the type of security features used with the rewritable card. The security feature reader supplies the appropriate excitation energy and sensor to generate a security signature signal as previously described.

The rewritable card printer also includes an erase head 602 for erasing a rewritable card prior to printing on the rewritable card. The erase head raises the temperature of the rewritable thermal film to the erasing temperature and any images previously written to the rewritable card are erased.

The rewritable card printer also includes a print head 604 for printing on the rewritable card. The print head raises the temperature of the thermal film on the rewritable card to the writing temperature and indicia are printed onto the rewritable card as a result.

The rewritable card printer also includes an optical scanning device 605 for reading the printed indicia on the rewritable card. The operation of such a device is more fully detailed in U.S. patent application Ser. No. 10/136,897, filed Apr. 30, 2002, the contents of which are hereby incorporated by reference as if stated herein in full.

The rewritable card printer also includes a magnetic strip read/write head 607 for reading from, and writing to a magnetic strip 214 (of FIG. 2) on the rewritable card.

The rewritable card printer includes a printer controller 606 operably coupled to the security feature reader. The security feature reader generates a security signature signal 608 that is transmitted to the printer controller.

The printer controller is also coupled to the erase head. The printer controller generates an erase control signal 612 that is transmitted to the erase head. In response to the erase head signal, the erase head heats the rewritable card until all indicia are erased from the rewritable card.

The printer controller is also coupled to the print head. The printer controller transmits print head control signals 616 to the print head. In response to the print head control signals, the print head heats a thermal element for each dot that is to be imaged on the rewritable card. The print head typically creates dot images to a granularity of 12 dots per millimeter, each dot image using a separate thermal element to create a dot image.

The printer controller is also coupled to the optical scanner 605. As the optical scanner scans the printed indicia on the rewritable card, the optical scanner transmits scanned signals 617 to the printer controller.

The printer controller is also coupled to the magnetic strip read/write head 607. The printer controller transmits magnetic strip write signals and receives magnetic strip read signals to and from (619) the magnetic strip read/write head.

The printer controller may also be coupled to a static memory read/write connector 622. The printer controller transmits static memory write signals and receives static memory read signals to and from (624) the static memory read/write head.

The rewritable card printer may also include an optional thermal write head and optional read head (not shown) operably coupled to the printer controller. The optional heads are used to write to and read from write-once media such as thermal paper used for vouchers or coupons. This enables the rewritable card printer to be used in establishments that use both rewritable cards and non-rewritable vouchers and coupons.

In one embodiment of a rewritable card printer in accordance with the present invention, a game controller 108 is operably coupled to the printer controller. The printer controller receives printer control instructions 614, including card information for writing to the rewritable card, from the game controller. The printer controller may also transmit printer status and card identification signals 610 to the game controller.

Figure 7A:
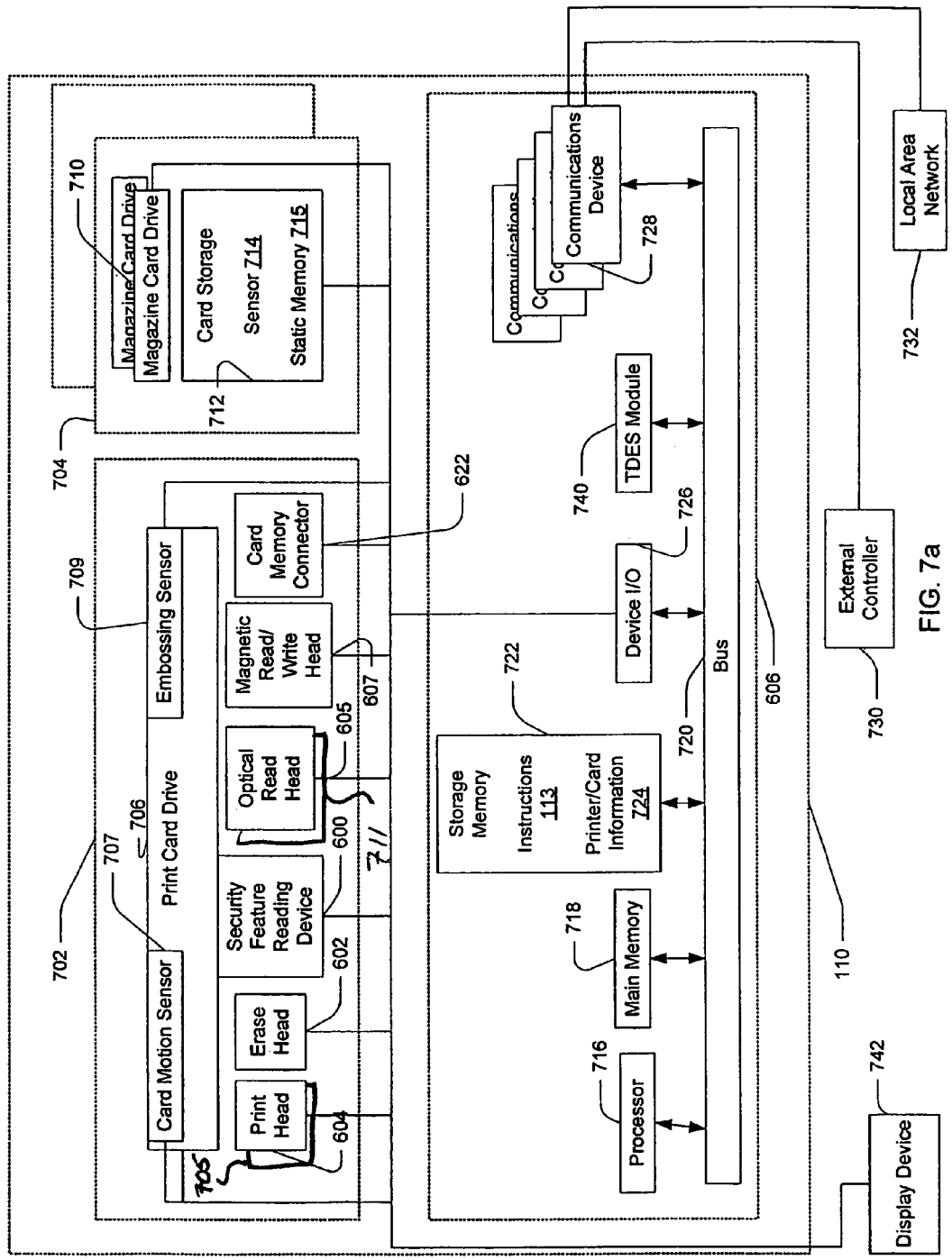
FIG. 7a is a block diagram of a rewritable card printer in accordance with an exemplary embodiment of the present invention.

FIG. 7a is a block diagram of a rewritable card printer in accordance with an exemplary embodiment of the present invention. A rewritable card printer 110 includes a printer controller 606, a print module 702, and one or more card magazines 704.

The print module includes a print card drive 706 that moves cards through the print module. The print card drive is reversible such that a card may be fed through the print module in more than one direction by the print card drive. The print card drive includes a card motion sensor 707 for sensing card movement within the print card drive. A more detailed discussion of printer media motion detection within a printer is presented in U.S. patent application entitled "PAPER MOTION DETECTOR IN A GAMING MACHINE", attorney docket number 50820/FLC/F392 filed Aug. 12, 2003, the contents of which are hereby incorporated by reference as if stated herein in full. The print drive further includes an embossing detector 709 that may be used to sense when an embossed item, such as a conventional credit card, is inserted into the print module. The embossing detector may be a mechanical device, such as a limit switch, that contacts an inserted card and detects any embossing. If an embossed card is inserted into the rewritable card printer, the rewritable card printer may not attempt to write to the card, only read the card.

The print module further includes a security feature reading device 600 for reading any security features included in the card. The print module further includes a print head 604 for writing indicia to the rewritable card and an erase head 602 for erasing the indicia from the rewritable card. The print module further includes an optical scanning device 605 for scanning the indicia printed onto a rewritable card. The print module further includes a magnetic strip read/write head 607 used to read and write from and to a rewritable card's magnetic strip. The print module may also further include an optional print head 705 and read head 711 for reading and writing to write-once media. The print module is removably and electronically coupled to the printer controller and removably and mechanically coupled to the card magazine.

In operation, the print module receives printer control signals from the printer controller. In response to the printer control signals, the print module scans rewritable cards for the presence and value of any security feature in the rewritable card. As the print module scans the rewritable card, the security feature reading device generates a previously described security signature signal that is transmitted to the printer controller. In addition, the print module thermally prints on the rewritable cards, and thermally erases the rewritable cards, under the control of the printer controller. The print module may also receive a rewritable card from a player and transmit a rewritable card detection signal to the printer controller.

The print module may also include a static memory read/write connector 622 for coupling to a "smart" card having a readable/writable static memory. The printer controller transmits static memory write signals and receives static memory read signals to and from the static memory read/write head.

The one or more independently controlled card magazines store rewritable cards and provide the rewritable cards to the printer module on command from the printer controller. Each card magazine may includes one or more magazine card drives 710 for moving cards into and out of the magazine. Each card magazine also includes a card storage area 712 for storage of rewritable cards. In operation, the card magazine receives card magazine control signals from the printer controller. In response to the control signals, the card magazine feeds cards to the printer from the card storage area using the magazine card drive. In response to the card magazine control signals, the card magazine may also receive rewritable cards from the print module and store the rewritable cards in the card storage area. The card magazine may also include one or more card sensors 714 used to detect the number of cards stored in the card storage area. The card sensors sense the quantity of cards stored in the card storage area and transmit card count signals to the printer controller for further processing. The card magazine may also include a read/write static memory 715 for semi-permanent storage of card information about cards stored in the card magazine.

The printer controller includes a processor 716 coupled to a main memory 718 by a system bus 720. The printer controller also includes a storage memory 722 coupled to the processor by the bus. The storage memory stores programming instructions 113, executable by the processor to implement the features of a rewritable card printer. The storage memory also includes printer and card information 724 stored and used by the processor. The printer and card information includes information received by the printer controller about the status of the print module and card magazine and also about the status and identity of any cards stored in the card magazines or being operated on by the print module. The types of status information may include an image of a last printed rewritable card as scanned by the optical scanning device and the current status, such as millimeters of advancement, of a card currently in the print module.

The printer controller also includes an Input/Output (I/O) device 726 coupled to the processor by the system bus. The I/O device is used by the printer controller to transmit control signals to the print module and the card magazine. The I/O device may also be used by the printer controller to receive security feature and status signals from the print module and card magazine.

One or more communications devices 728 may be coupled to the system bus for use by the printer controller to communicate with a cashless gaming system host 102 or a game controller 108 (both of FIG. 1). The printer controller uses the communication devices to receive commands, program instructions, and card information from the external devices. In addition, the printer controller may use the communication devices to transmit printer status information to the external devices. Other communication devices may also be used by the printer controller to couple in a secure fashion over a local area network 732 for administrative or other purposes.

Additional communication devices and channels may be provided for communication with other peripheral devices as needed. For example, one communication device may be provided with a local communications port, accessible from an exterior of a gaming machine hosting the rewritable card printer, that a technician may use to communicate with the printer controller during servicing using an external controller 730. The external controller may communicate with the printer controller using an infrared link, other short-range wireless communication link, are a hard link with an external connector in a secure manner.

The processor may be further coupled to an encryption/decryption module 740 that may be used to encrypt and decrypt messages encoded using the an encryption standard. This enables the printer controller to engage in secure transactions with external devices. The processor may access the display device either as a component through the bus as shown or as an external device through a communications device using a high level communications protocol. In addition, the printer controller may also include program instructions to perform encryption/decryption services as well.

The processor may be further coupled to a display device 742 that may be used to display printer status information or card information. For example, the display may used to display an "as-scanned" version of the most recently printed and scanned card. The processor may access the display device either as a component through the I/O device or as an external device through a communications device.

In operation, the processor loads the programming instructions into the main memory and executes the programming instructions to implement the features of a rewritable card printer as described herein.

As illustrated, the printer controller is shown as being electronically coupled to the print module and card magazine without any mechanically coupling. The printer controller may be mounted in a variety of ways and may be incorporated into various components of either the rewritable card printer or the game hosting the rewritable card printer. For example, the printer controller may be attached to and supported by the print module, the card magazine, or the host game as may be required to mechanically integrate the rewritable card printer into the host game.

Figure 7B:
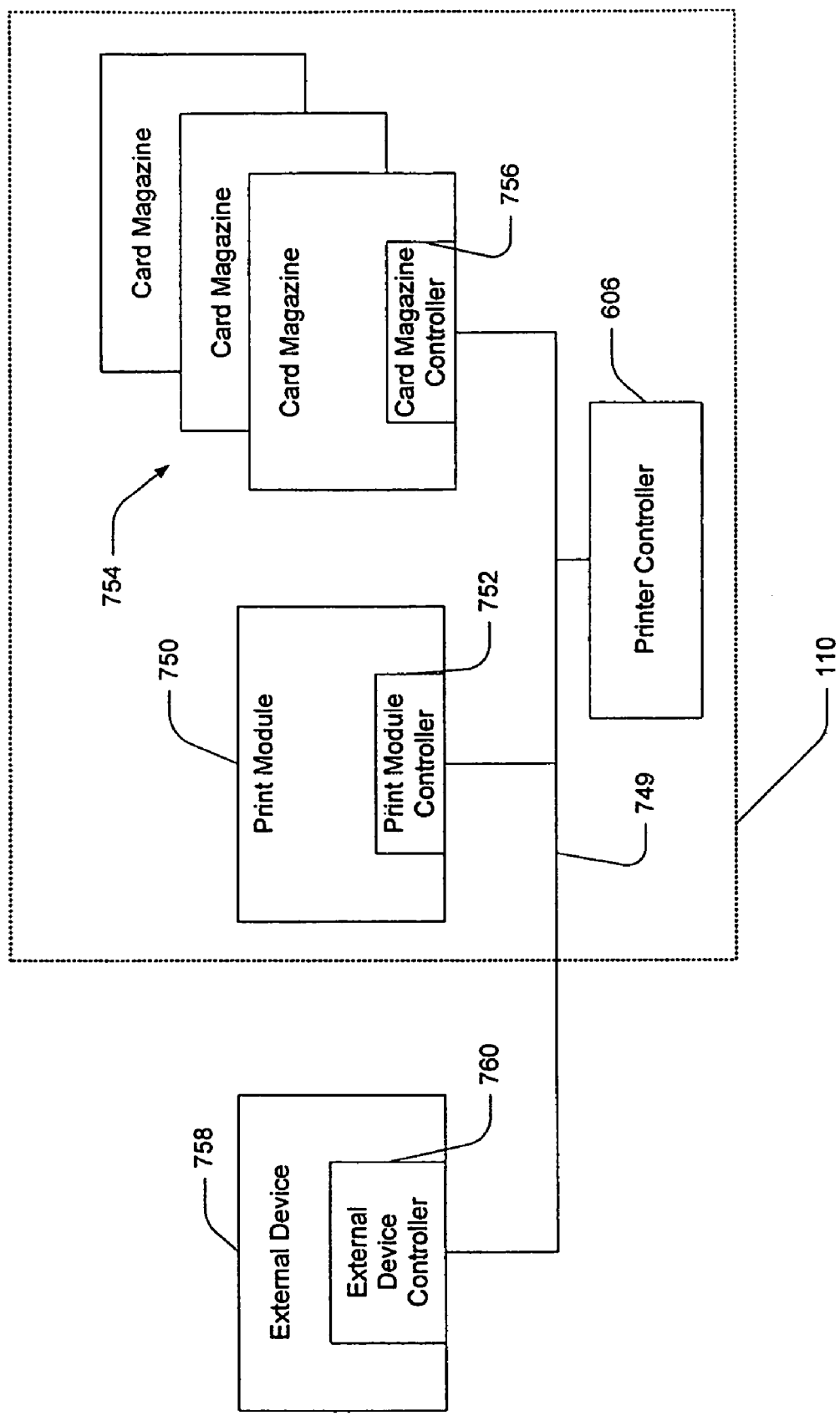
FIG. 7b is an architecture diagram of a rewritable card printer employing components having integral controllers in accordance with an exemplary embodiment of the present invention.

FIG. 7*b* is an architecture diagram of a rewritable card printer employing components having integral controllers in accordance with an exemplary embodiment of the present invention. A rewritable card printer 110 may be composed of a printer controller 606 that communicates with components and modules of the rewritable card printer using a communications link 749. The communications link may use either serial or parallel communications protocols to communicate with the components of the rewritable card printer. In this embodiment a print module 750 includes a print module controller 752 coupled to the printer controller. To control the operations of the print module, the printer controller transmits high level commands and status requests to the print module. In response, the print module performs the commands and transmits the requested information.

One or more card magazines 754 may also have integral card magazine controllers that are coupled to the printer controller via the communications link. To control the operations of the card magazine, the printer controller transmits high level commands and status requests to the card magazine. In response, the card magazine performs the commands and transmits the requested information to the printer controller.

The internal architecture of the rewritable card printer may be extended to external devices 758 as well, each having its own internal controller 760. In this embodiment, the printer controller communicates with the external device using high level commands. In response, the external device performs the commands and transmits any requested information to the printer controller. An example of an external device having its own internal controller includes an external card magazine or cassette used to load cards into, or retrieve cards from, the rewritable card printer.

Figure 8:
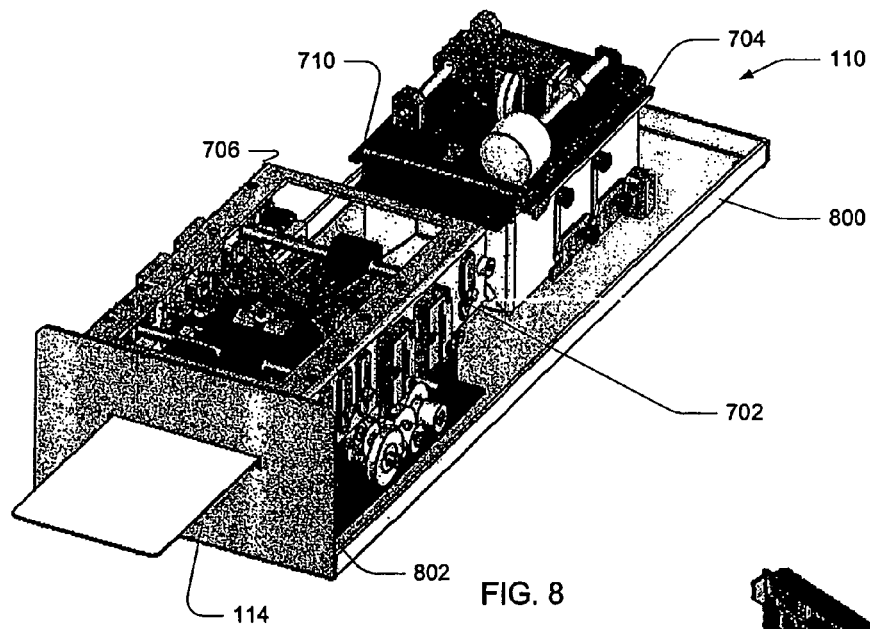
FIG. 8 is an isometric view of a rewritable card printer in accordance with an exemplary embodiment of the present invention.

FIG. 8 is an isometric view of a rewritable card printer in accordance with an exemplary embodiment of the present invention. As illustrated, the rewritable card printer 110 includes a print module 702 and one or more card magazines 704 mechanically coupled on a base 800. The rewritable card printer includes a front bezel 802 through which a rewritable card 114 may be fed by the print module's print card drive 706, either into or out of the rewritable card printer as previously described. The card magazine is positioned on the base such that the card magazine's magazine card drive 710 may feed rewritable cards to and receive rewritable cards from the print module as previously described. The print module and the magazine drive are separately mounted to the base and each may separately serviced in the field without affecting the operation of the other. In addition, each component may be removed from the rewritable card printer and replaced without removing the power to the rewritable card printer.

As the print module and card magazine are separately mounted and controllable, the orientation of the print module and card magazine may be altered as needed to suit the mechanical requirements of a host game. For example the distance between the print module and the card magazine may be altered in order to accommodate a shorter printer bay included in a host game.

In one card magazine in accordance with an exemplary embodiment of the present invention, the cards are stored in the card magazine at an angle, up to 90 degrees, relative to the orientation to a card as it is fed into or out of a print module. This allows the card magazine to accommodate a larger number of cards in a given space, thus enhancing the card magazine's storage capabilities. In operation, the magazine card drive receives the card from the print module or another card magazine and tilts the card as it is added to the card storage area. When a card is retrieved from the card magazine, the magazine card drive reorients the card into a proper position for presentation to the print module.

Figure 9:
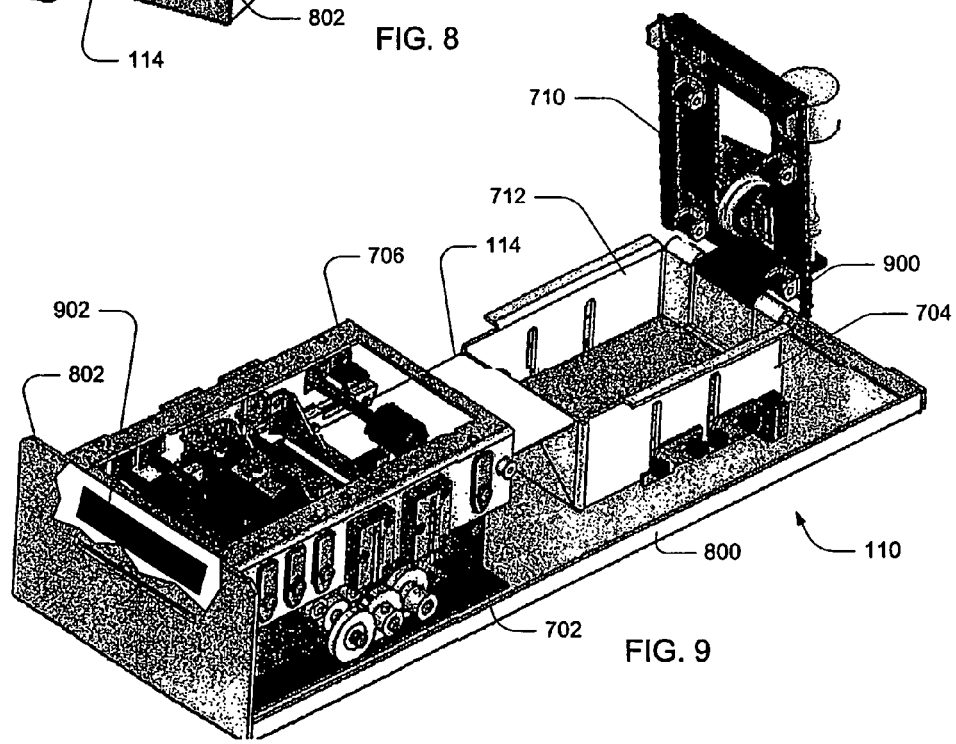
FIG. 9 is an isometric view of a rewritable card printer with the card magazine opened in accordance with an exemplary embodiment of the present invention.

FIG. 9 is an isometric view of a rewritable card printer with the card magazine opened in accordance with an exemplary embodiment of the present invention. As illustrated, the rewritable card printer 110 includes a print module 702 and one or more card magazines 704 mechanically coupled on a base 800. The rewritable card printer includes a front bezel 802 through which a rewritable card 114 may be fed by the print module's print card drive 706, either into or out of the rewritable card printer, as previously described. The card magazine is positioned on the base such that the card magazine's magazine card drive 710 may feed rewritable cards to and receive rewritable cards from the print module as previously described. The magazine card drive is removably coupled to the card storage area 712 by a hinge 900 such that the magazine may be opened to allow access to the card storage area.

A cleaning device 902 (shown through a cutaway in the front bezel 802) is attached to the print module such that incoming rewritable cards are cleaned before they enter the print module. The cleaning device may include flexible solid or bristled wiper elements that contact the card as it is taken into the print module. The wiper elements may be conductive so as to remove static surface charges from the card as it moves in the card printer. The wiper elements may also be charged so as to electrically attract and collect particles of dust and dirt from the card. As the print module's print card drive is reversible, the incoming card may be passed repeatedly, back and forth, through the cleaning element as needed.

In other print modules in accordance with other exemplary embodiments of the present invention, the cleaning device may be located within the print module, within the card magazine, or between the print module and a card magazine. In other rewritable card printers in accordance with exemplary embodiments of the present invention, the cleaning device is a separate device and not integrated with either a print module or a card magazine. Instead, the cleaning device is a separate motorized device similar to a card magazine and is electronically coupled to a printer controller.

Figure 10:
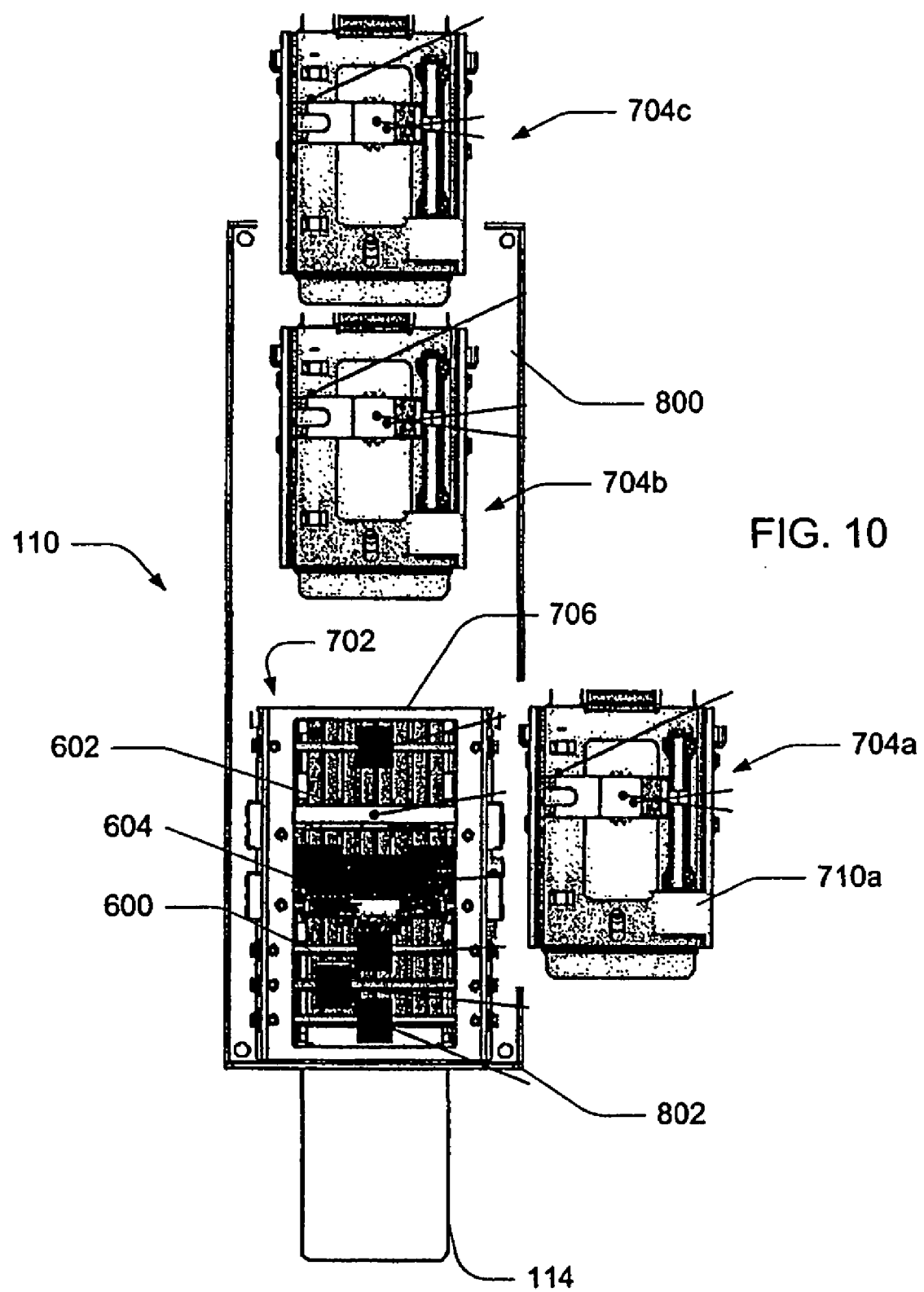
FIG. 10 is a top plan view of a rewritable card printer in accordance with an exemplary embodiment of the present invention.

FIG. 10 is a top plan view of a rewritable card printer in accordance with an exemplary embodiment of the present invention. The rewritable card printer 110 includes a print module 702 and one or more card magazines 704a, 704b, and 704c that are mechanically coupled on a base 800. The rewritable card printer includes a front bezel 802 through which a rewritable card 114 may be fed by the print module's print card drive 706, either into or out of the rewritable card printer, as previously described. The plan view also illustrates a possible relative position of a security feature reading device 600, a print head 604, and an erase head 602 within the print module. Card magazine 704a is positioned on the base such that the card magazine's magazine card drive 710a may feed rewritable cards to and receive rewritable cards from the print module as previously described.

In the top view, additional positions for card magazines are illustrated. These additional card magazine positions may be used to mount one or more card magazines in various relationships to the print module as may be dictated by an existing printer bay in a host game. In one possible configuration, a card magazine 704a is located to the side of the print module. In another configuration, two card magazines, 704b and 704c, are mounted such that the card magazines may feed and receive rewritable cards to and from each other as companions. As illustrated, card magazine 704b is the primary card magazine and may feed cards into and receive cards from the print module. Card magazine 704c is a secondary card magazine that may feed cards to and receive cards from the primary card magazine.

Card magazines configured so as to allow movement of cards between the card magazines are herein termed "companion" magazines. Companion card magazines may be used to move rewritable cards around such that individual rewritable cards may be identified and retrieved from storage. This is because a card magazine with a single magazine card drive may be used as a Last In First Out (LIFO) rewritable card "memory" where the last rewritable card placed into the card magazine will be the first rewritable card retrieved from the card magazine when a rewritable card is requested. Through the use of multiple magazine drives serving a single rewritable card storage location, different styles of rewritable card memories may be implemented such as a First In First Out (FIFO) memory.

Companion card magazines may also be used to store different kinds of rewritable cards for use by the rewritable card printer. For example, the rewritable cards may have different permanent graphics imprinted on them indicating different user affiliations such as affiliations to different loyalty reward programs. In this way, a user may "upgrade" their affiliations by inserting a first style of rewritable card into the rewritable card printer and exchange it for a second style of rewritable card.

Figure 11A:
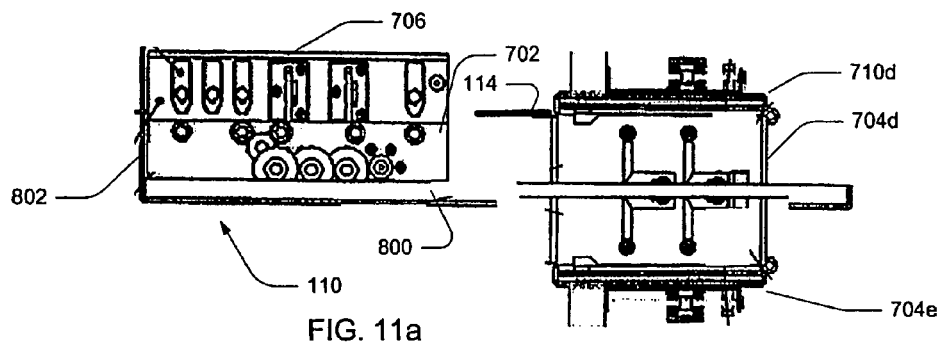
FIG. 11a is side elevation view of a rewritable card printer in accordance with an exemplary embodiment of the present invention.

FIG. 11a is side elevation view of a rewritable card printer in accordance with an exemplary embodiment of the present invention. The rewritable card printer 110 includes a print module 702 and one or more card magazines 704d and 704e mechanically coupled to a base 800. The rewritable card printer includes a front bezel 802 through which a rewritable card may be fed by the print module's print card drive 706, either into or out of the rewritable card printer as previously described. Card magazine 704d is positioned on the base such that the card magazine's magazine card drive 710d may feed rewritable cards to and receive rewritable cards from the print module as previously described.

In the side view, an additional position for a card magazine is shown as card magazine 704e located beneath card magazine 704d. This position may be used to mount a card magazine as either a previously described primary or secondary card magazine. In addition, card magazine 704e may be replaced by a larger card storage area for card magazine 704d that extends through the base.

Figure 11B:
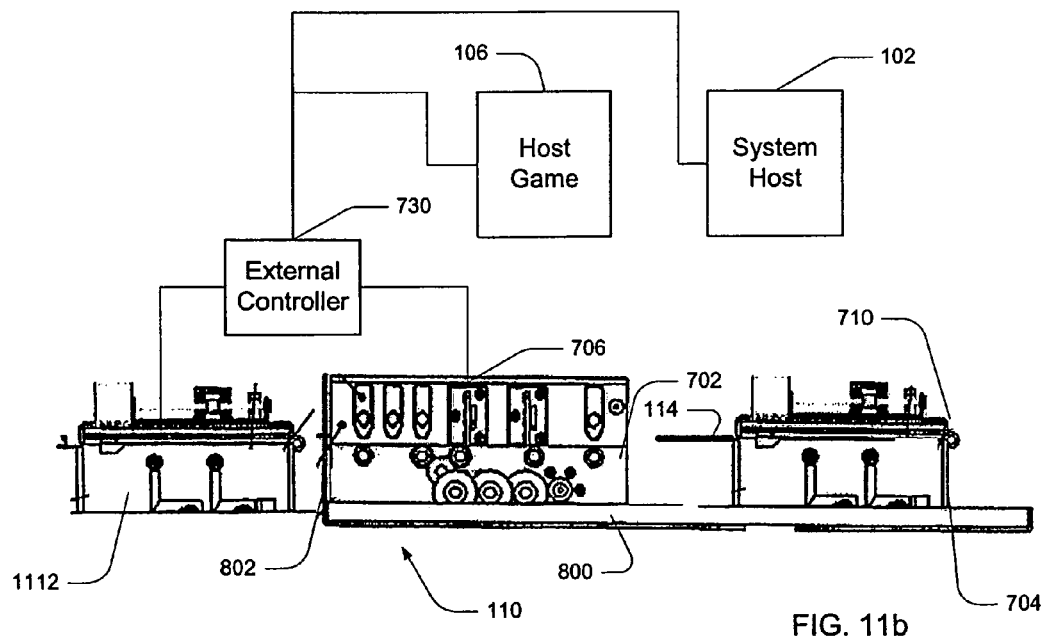
FIG. 11b is side elevation view of a rewritable card charging process in accordance with an exemplary embodiment of the present invention.

FIG. 11b is side elevation view of a rewritable card charging and retrieval process in accordance with an exemplary embodiment of the present invention. The rewritable card printer 110 includes a print module 702 and a card magazine 704 mechanically coupled to a base 800. The rewritable card printer includes a front bezel 802 through which a rewritable card may be fed by the print module's print card drive 706, either into or out of the rewritable card printer as previously described. Card magazine 704 is positioned on the base such that the card magazine's magazine card drive 710 may feed rewritable cards to and receive rewritable cards from the print module as previously described.

A technician may use an external controller 730 electronically coupled to the rewritable card printer and to an external card magazine 1112 removable and mechanically coupled to the rewritable card printer to load rewritable cards into and retrieve cards, such as escrowed cards, from the rewritable card printer. This may be done without opening a cabinet in a game hosting the rewritable card printer. To load cards into the rewritable card printer, the technician couples the external controller and external card magazine to the rewritable card printer. The technician then uses the external controller to send a card load signal to the rewritable card printer and the external card magazine. In response to the card load signal, the external card magazine dispenses cards into the rewritable card printer print module. In response to the card load signal, the print module accepts the dispensed cards and forwards them to an appropriate internal card magazine in the rewritable card printer.

To retrieve cards from the rewritable card printer, the technician couples the external controller and external card magazine to the rewritable card printer. In response to the card retrieval signal, the rewritable card printer retrieves cards from the rewritable card printer's one or more internal card magazines and dispenses the cards using the printer module. In response to the card retrieval signal, the external card magazine receives the dispensed cards from the rewritable card printer and stores them.

Optionally, the external print controller may store the number of rewritable cards loaded into the rewritable card printer, an identification of each of the rewritable cards loaded into the rewritable card printer, and an identifier of the rewritable card printer.

To keep track of the rewritable cards held by the rewritable card printer, the rewritable card printer may receive from the external controller a rewritable card identifier for each card dispensed by the external card magazine. The rewritable card printer may also scan each rewritable card for its identifier as each rewritable card is dispensed into the rewritable card printer.

In one rewritable card printer in accordance with an exemplary embodiment of the present invention, the rewritable card printer's printer controller contains all of the program instructions necessary to perform card loading and retrieval operations. In this embodiment, the external card magazine couples electronically with the rewritable card printer's printer controller and the rewritable card printer's printer controller commands the external card magazine to dispense and receive cards. The external controller may also communicate directly to the host game 106 or the system host 102.

An external controller may be implemented in a variety of different external devices. For example, the external controller may be a purpose-built controller. Other external controllers may be implemented in a programmable device such a Personal Digital Assistant (PDA) or a portable or "laptop" computer.

Figure 11C:
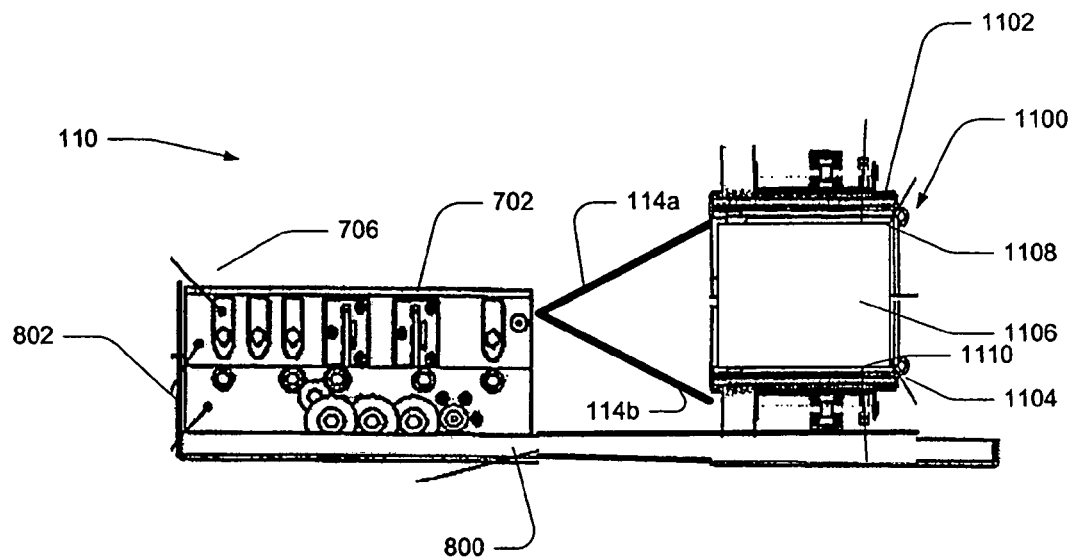
FIG. 11c is a side elevation view of a rewritable card printer with a card magazine having two independent magazine card drives in accordance with an exemplary embodiment of the present invention.

FIG. 11c is a side elevation view of a rewritable card printer with a card magazine having two independent magazine card drives in accordance with an exemplary embodiment of the present invention. The rewritable card printer 110 includes a print module 702 and a card magazine 1100 mechanically coupled to a base 800. The rewritable card printer includes a front bezel 802 through which a rewritable card may be fed by the print module's print card drive 706, either into or out of the rewritable card printer as previously described.

Card magazine 1100 includes a first magazine card drive 1102 and a second magazine card drive 1104. The card is positioned on the base such that the card magazine's magazine card drives may feed rewritable cards, 114a and 114b, to and receive rewritable cards from the print module using the same card storage area 1106. The first magazine card drive receives and dispenses cards from a first end 1108 of the card storage location. The second card magazine drive receives and dispenses cards from a second end 1110 of the card storage location. In this way, the card magazine may be used as a LIFO card storage device or a FIFO card storage device depending on whether two drives or one drive are employed. In addition, the magazine card drives may be used to store cards in the card storage location at an angle, such as at a 90 degree angle, relative to the orientation of the card while the card is being operated on by the printer module.

Figure 11D:
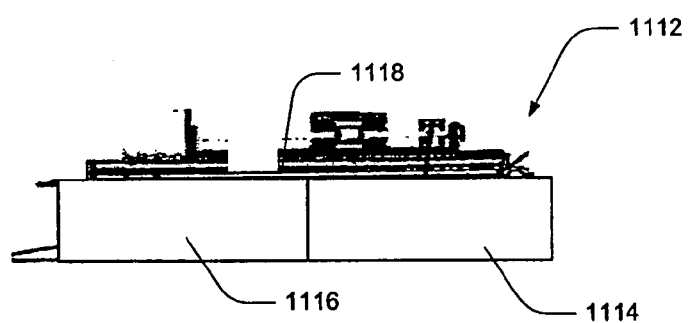
FIG. 11d is a side elevation view of a card magazine having a plurality of card storage locations serviced by a single card magazine drive in accordance with an exemplary embodiment of the present invention.

FIG. 11*d* is a side elevation view of a card magazine having a plurality of card storage locations serviced by a single card magazine drive. A card magazine 1112 may have a plurality of card storage locations, such as card storage locations 1114 and 1116. A single magazine card drive 1118 may service both card storage locations. In this way, a single card magazine may be used to shuffle cards to locate specific cards or rotate cards in storage to even out erase and write cycles performed on the cards.

Figure 11E:
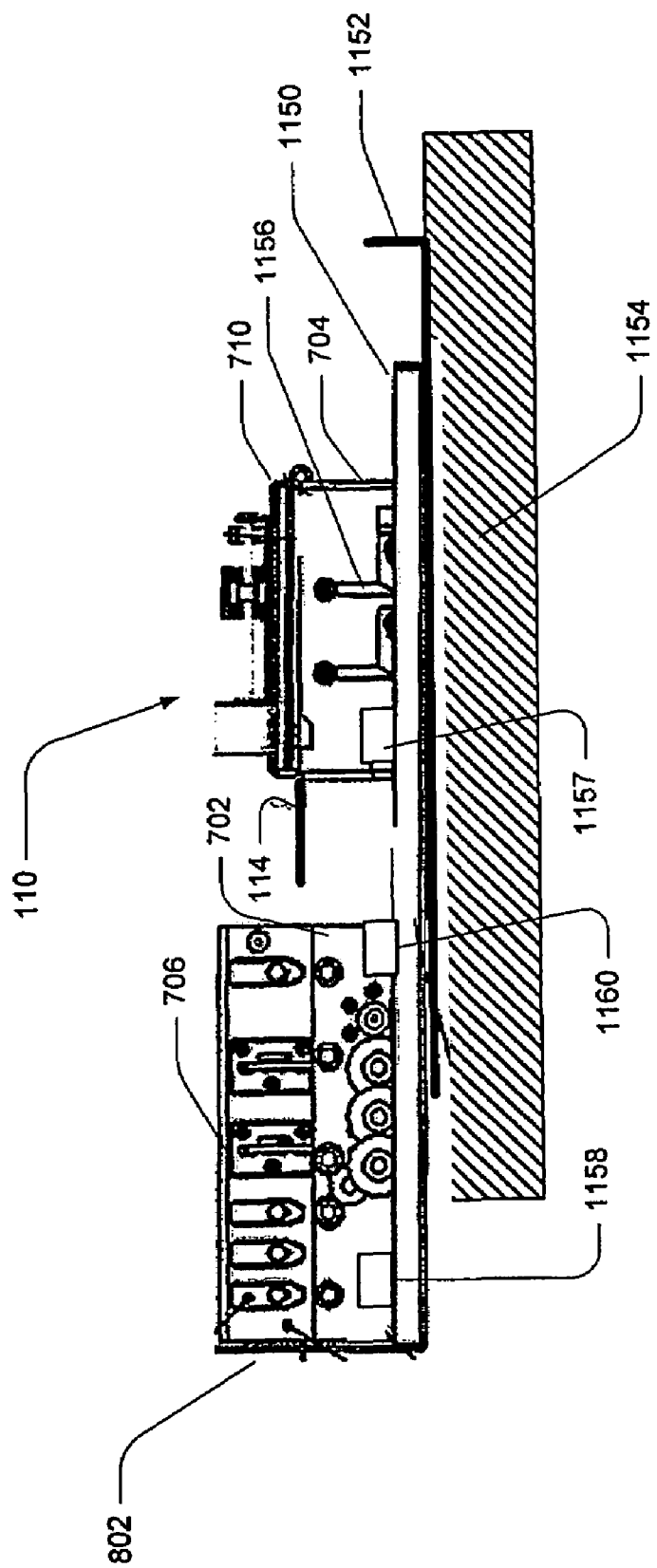
FIG. 11e is side elevation view of a rewritable card printer slidably coupled to a gaming machine in accordance with an exemplary embodiment of the present invention.

FIG. 11*e* is side elevation view of a rewritable card printer slidably coupled to a gaming machine in accordance with an exemplary embodiment of the present invention. The rewritable card printer 110 includes a print module 702 and a card magazine 704 mechanically coupled to a printer base 1150. The rewritable card printer includes a front bezel 802 through which a rewritable card may be fed by the print module's print card drive 706, either into or out of the rewritable card printer as previously described. Card magazine 704 is positioned on the base such that the card magazine's magazine card drive 710 may feed rewritable cards 114 to and receive rewritable cards from the print module as previously described.

The printer base is further slidably coupled to a base plate 1152 that is fixedly coupled to a portion 1154 of a gaming machine hosting the printer. The rewritable card printer may be accessed while still in the gaming machine by sliding the rewritable card printer out of the gaming machine. The card magazine may be mechanically coupled to the printer base by a quick disconnect 1156 so that the card magazine may be easily removed. To facilitate easy removal, the card magazine may be coupled to the printer controller 606 (of FIG. 7*a*) by a quick disconnect electrical connector 1157 that allows the card magazine to be installed, removed, or exchanged without removing the power to the gaming machine or rewritable card printer.

The print module may be mechanically coupled to the printer base by a quick disconnect 1158 so that the print module may be easily removed. To further facilitate easy removal, the print magazine may be coupled to the printer controller 606 (of FIG. 7*a*) by a quick disconnect electrical connector 1160 that allows the print module to be installed, removed, or exchanged without removing the power to the gaming machine or rewritable card printer.

In one embodiment of a card magazine, the card magazine is slidably coupled to the printer base separately from the print module. In this embodiment, the card magazine may accessed by sliding the card magazine past the print module so that the card magazine may be separately serviced.

Figure 12:
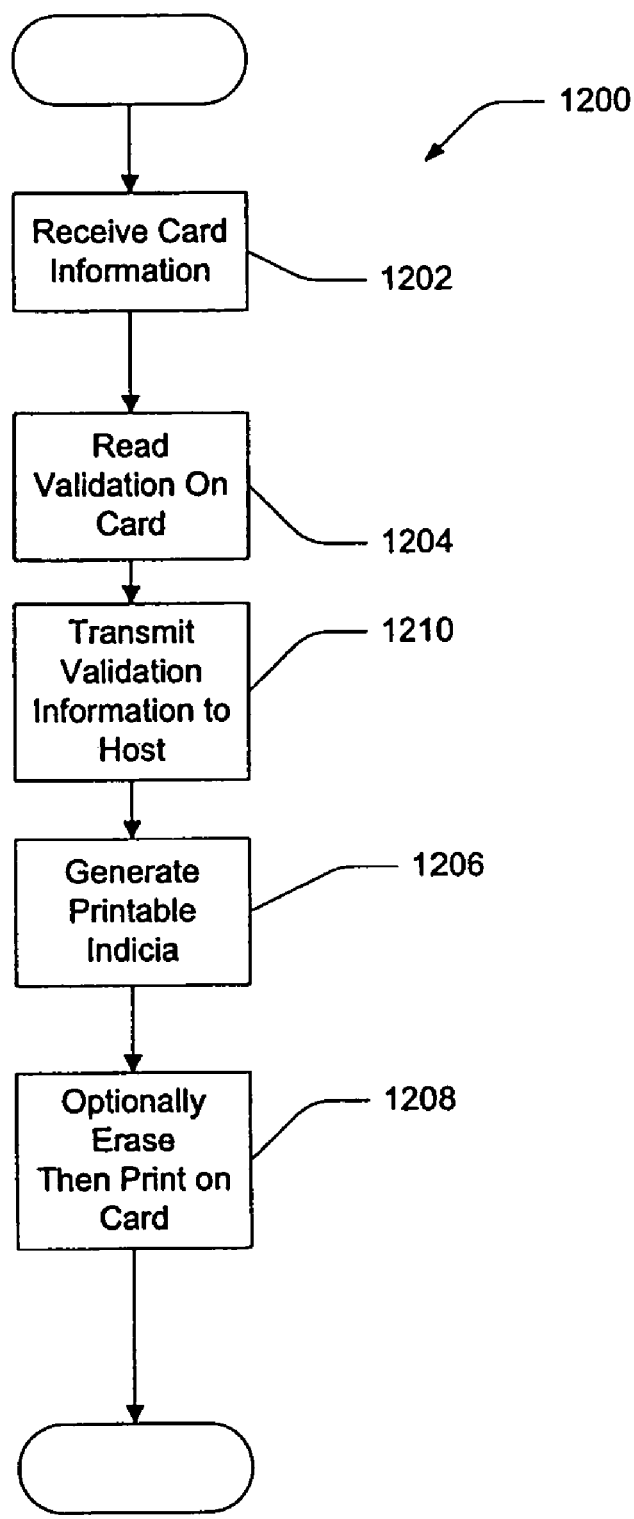
FIG. 12 is a process flow diagram of a rewritable card printing process in accordance with an exemplary embodiment of the present invention.

FIG. 12 is a process flow diagram of a rewritable card printing process in accordance with an exemplary embodiment of the present invention. During a printing process 1200, a rewritable card printer receives (1202) rewritable card information such as cash-out value or images to print onto the rewritable card. The rewritable card printer reads (1204) any security feature embedded in the rewritable card, storing the resultant security signature signal in temporary memory. The rewritable card printer generates (1206) indicia to print onto the rewritable card using the rewritable card values or images. Additionally, the rewritable card printer may incorporate all or a portion of security signature signal into the printed indicia as either a clearly readable value or an encoded value. The rewritable card printer then optionally erases (1208) the rewritable card and then prints the indicia onto the rewritable card prior to dispensing the rewritable card. The rewritable card printer may then transmit (1210) the security signature signal, either as an encoded value or as a clearly readable value, to a game host or cashless enabled system host.

Figure 13:
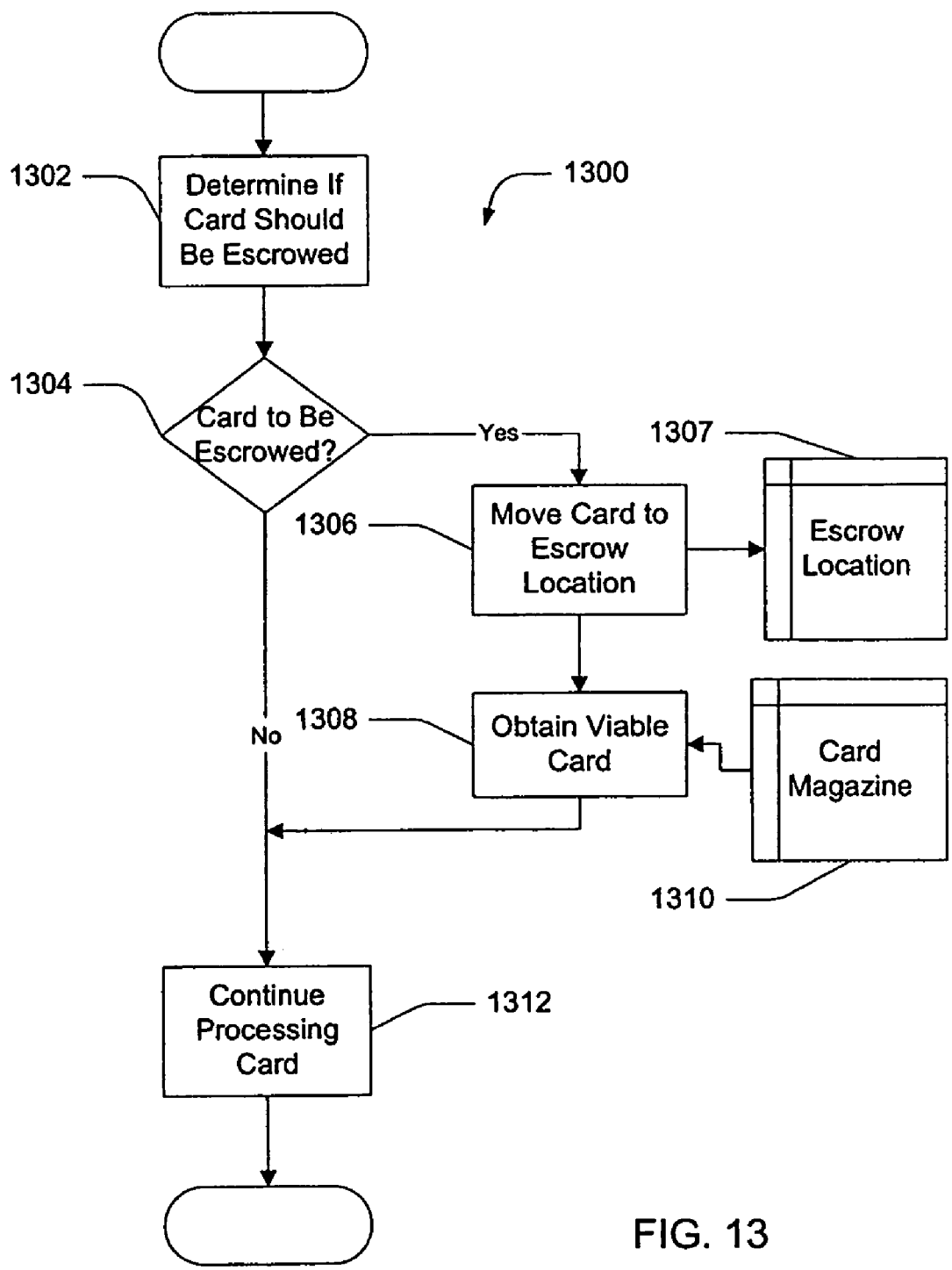
FIG. 13 is a process flow diagram of a card escrowing process used by a rewritable card printer in accordance with an exemplary embodiment of the present invention.

FIG. 13 is a process flow diagram of a card escrowing process used by a rewritable card printer in accordance with an exemplary embodiment of the present invention. In a card escrowing process 1300, a rewritable card printer determines if a card should be removed from service. A card may be removed from service for a variety of reasons. Rewritable cards have a finite number of erase and write cycles and so must be removed from service as they age. A card may become damaged so that it is no longer operable within rewritable card printer or the rewritable card's security feature is no longer readable. Cards may also have physical features such as embossing that may require the card to be handled in a special manner. As the rewritable card printer includes an optical scanner and can verify if a card was printed properly immediately after printing the card, the rewritable card printer may determine that a card was printed in error and may escrow the card. In addition, the rewritable card printer may receive an identifier for a rewritable card to be removed from service. In which case, the security feature in the rewritable card may be readable but correspond to a card to be removed from service. Another reason a card may be escrowed is that the user is exchanging one kind of rewritable card for another kind of rewritable card.

Cards may be removed from service by moving the card into an escrow location within the rewritable card printer by either a magazine card drive or by a print card drive. In the escrow process, the rewritable card determines (1302) if a card should be removed from service. If the rewritable card printer determines that the card should remain in service (1304), the rewritable card continues processing (1306) the rewritable card. Otherwise, the rewritable card printer moves (1306) the rewritable card to an escrow location 1307 within the rewritable card printer and obtains (1308) a replacement card from a card magazine 1310 and continues processing (1312) the newly obtained rewritable card.

Figure 14:
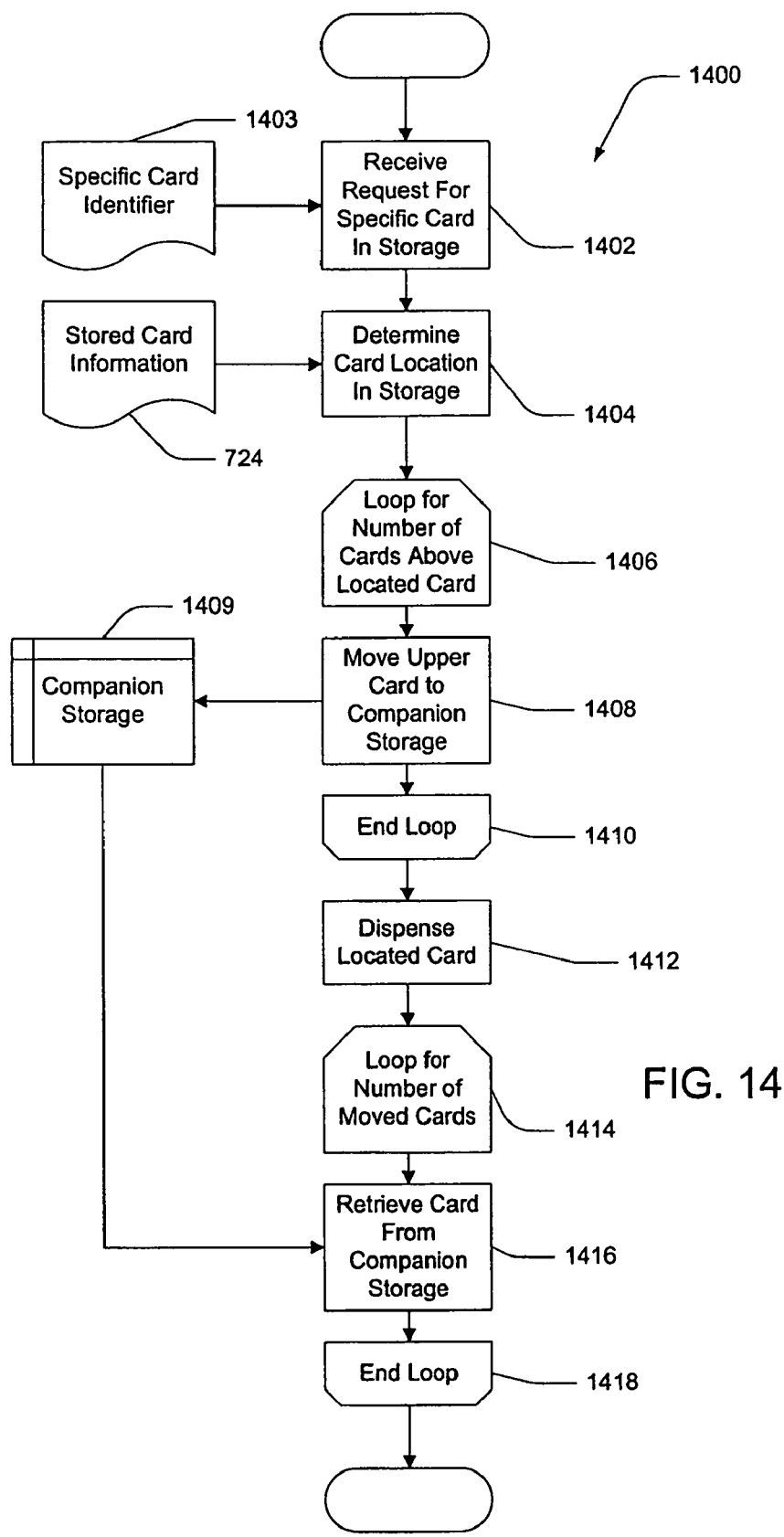
FIG. 14 is a card retrieval process used by a rewritable card printer having companion magazines in accordance with an exemplary embodiment of the present invention.

FIG. 14 is a card retrieval process used by a rewritable card printer having companion magazines in accordance with an exemplary embodiment of the present invention. As noted previously, a card magazine having a single magazine card drive may be considered as being similar to a LIFO memory device. As previously noted, a rewritable printer controller may store information about cards stored in the card magazines. This information may include where in a card magazine a particular rewritable card is stored. In this case, a specific card stored in the card magazines may be retrieved using the following process.

In a card retrieval process 1400, a rewritable card printer receives a request for a specific rewritable card from an external host or a game controller. The rewritable card printer receives (1402) the request and determines (1404) where in the storage areas of the card magazines that the specific card is located using previously stored card information 704. For the number of cards on top of the request card, the rewritable card moves (as indicated by loop structure 1406, to 1410) all of the cards on top of the requested card into a companion card magazine's storage area 1409. The rewritable card printer then dispenses (1412) the located card. Optionally, the rewritable card printer may replace all of the moved cards from the companion card magazine (as indicated by loop structure 1414, 1416, and 1418).

Figure 15:
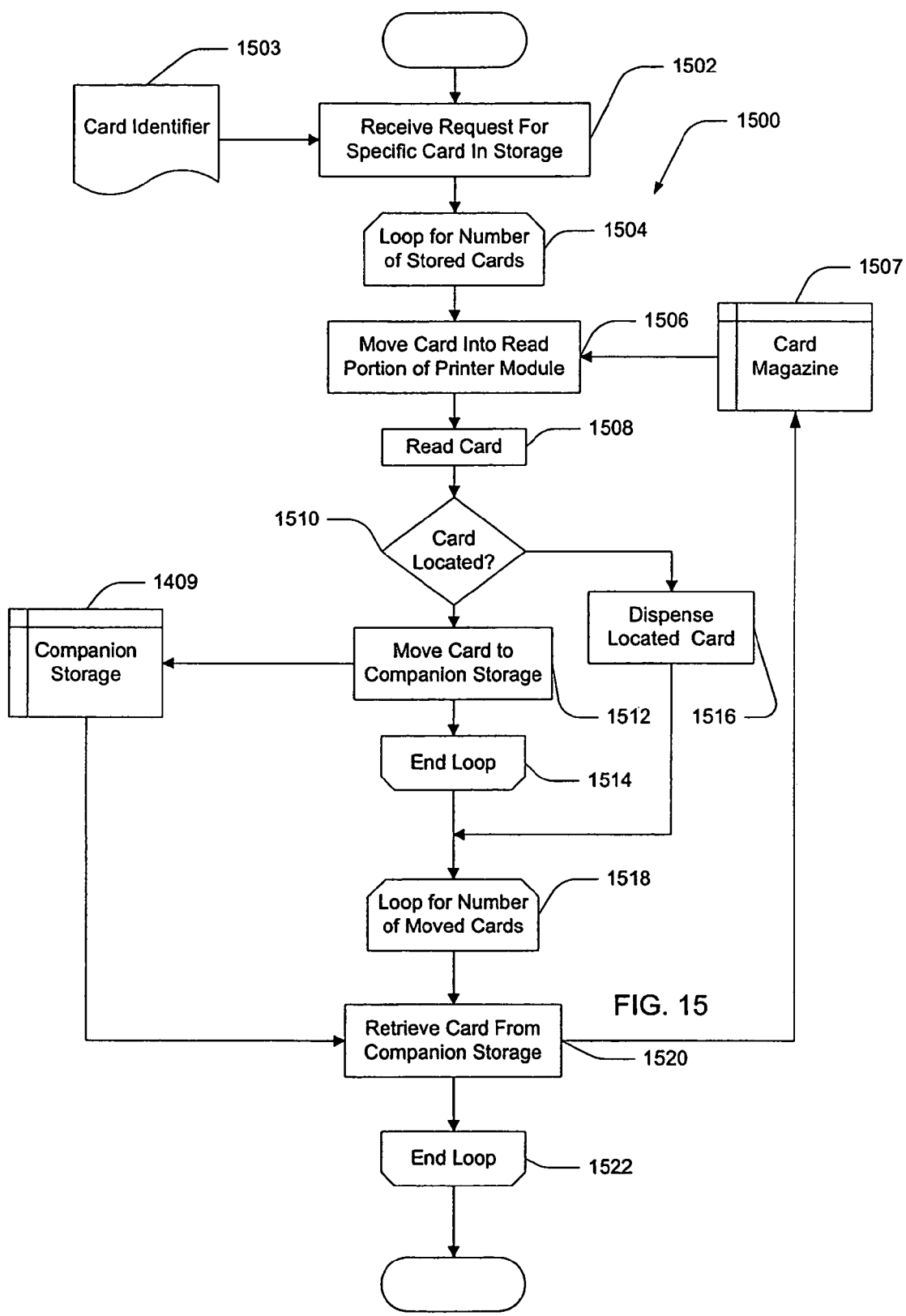
FIG. 15 is a process flow diagram of a card location process used by a rewritable card printer having multiple card magazines in accordance with an exemplary embodiment of the present invention.

FIG. 15 is a process flow diagram of a card location process used by a rewritable card printer having multiple card magazines in accordance with an exemplary embodiment of the present invention. This card location process, 1500, may be used when the rewritable card printer does not keep an accounting of each writeable card stored in the rewritable card printer's memory. The rewritable card printer receives (1502) an identifier for a card to be located. For each rewritable card stored by the rewritable card printer in a card magazine (as indicated by the loop structure 1504 to 1514), the rewritable card printer moves (1506) a rewritable card from a card magazine 1507 into a read portion of the print module 702 (of FIG. 7) and reads (1508) an identifier, such as a previously described security feature, from the rewritable card. The rewritable card printer then compares (1510) the read identifier to the received identifier. If the comparison indicates that the requested rewritable card is located, the rewritable card printer dispenses (1516) the located card. If the comparison indicates that the retrieved rewritable card is not the requested rewritable card, the rewritable card printer moves the card into a companion card magazine's storage location 1409 and continues processing rewritable card until either the requested card is located or the last of the stored rewritable cards is retrieved.

Optionally, the rewritable card printer may put all of the moved rewritable cards back into their original locations within a card magazine. For each of the moved-cards (as indicated by the loop structure 1518 to 1522) the rewritable card printer retrieves (1520) a moved card out of the companion storage location and places it back into the card magazine 1507.

Figure 16:
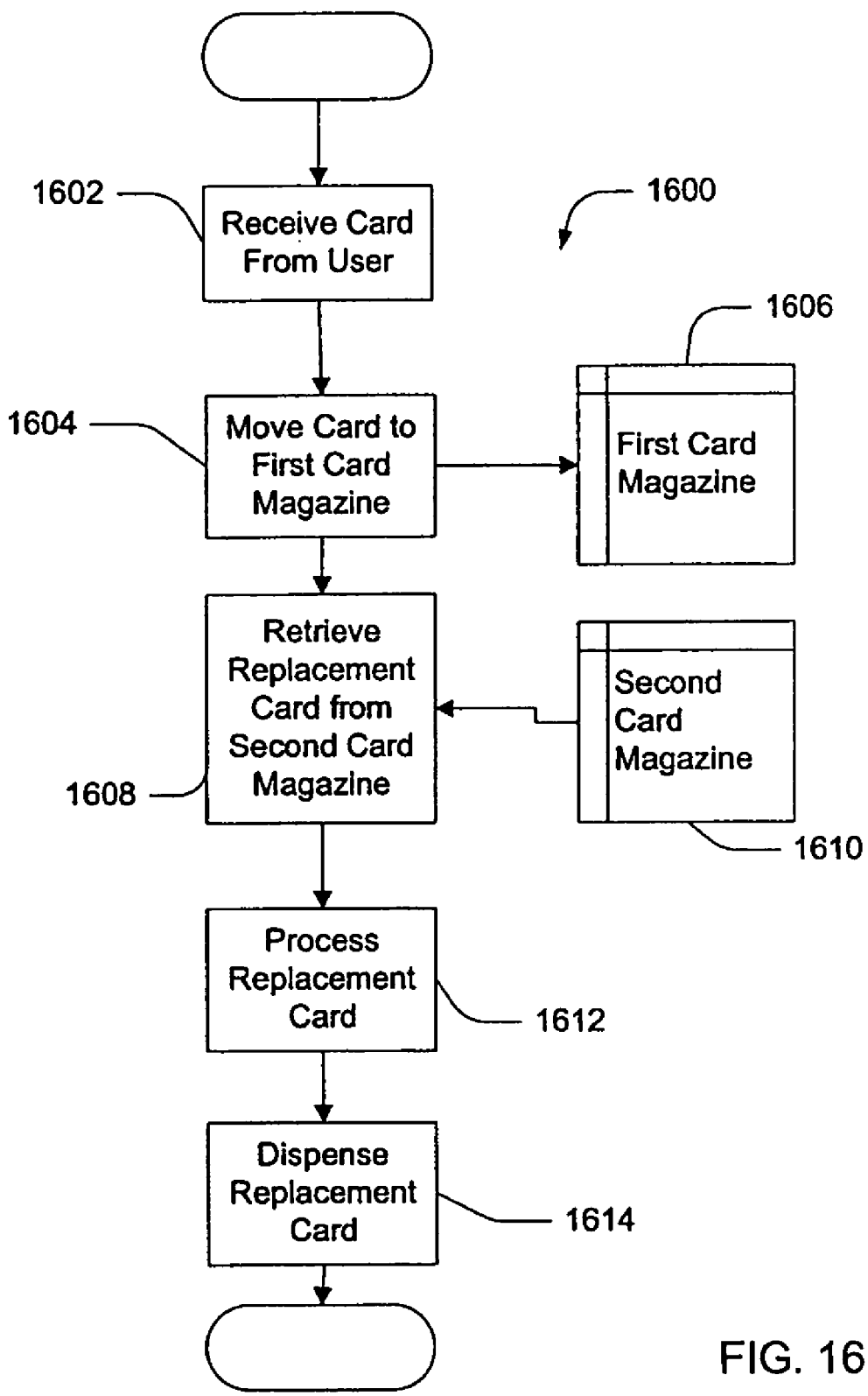
FIG. 16 is a process flow diagram of a card replacement process in accordance with the present invention.

FIG. 16 is a process flow diagram of a card replacement process in accordance with an exemplary embodiment of the present invention. A rewritable card printer may include two or more card magazines as previously discussed. This feature allows a gaming machine to be used for more sophisticated transactions than merely accepting wagers, playing games, and printing cash-out cards. Using multiple card magazines allows a gaming machine to also function as a customer service kiosk for several types of operations wherein a player may exchange one type of rewritable card for another during a transaction. An example of such a transaction is when a player wants to join a loyalty program.

In a card replacement process 1600, a rewritable card printer receives (1602) a card from a user for imprinting. The rewritable card printer moves (1604) the received card into a first card magazine 1606 for storage and possible reuse. The rewritable card printer then retrieves (1608) a replacement card from a second card magazine 1610. The rewritable card printer continues processing (1612) the replacement card such as by printing on the card as previously described. The rewritable card printer dispenses (1614) the imprinted replacement card to the user whereby the user's original card has been replaced with another type of card.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this application and the claims' equivalents rather than the foregoing description.

Figure 17:
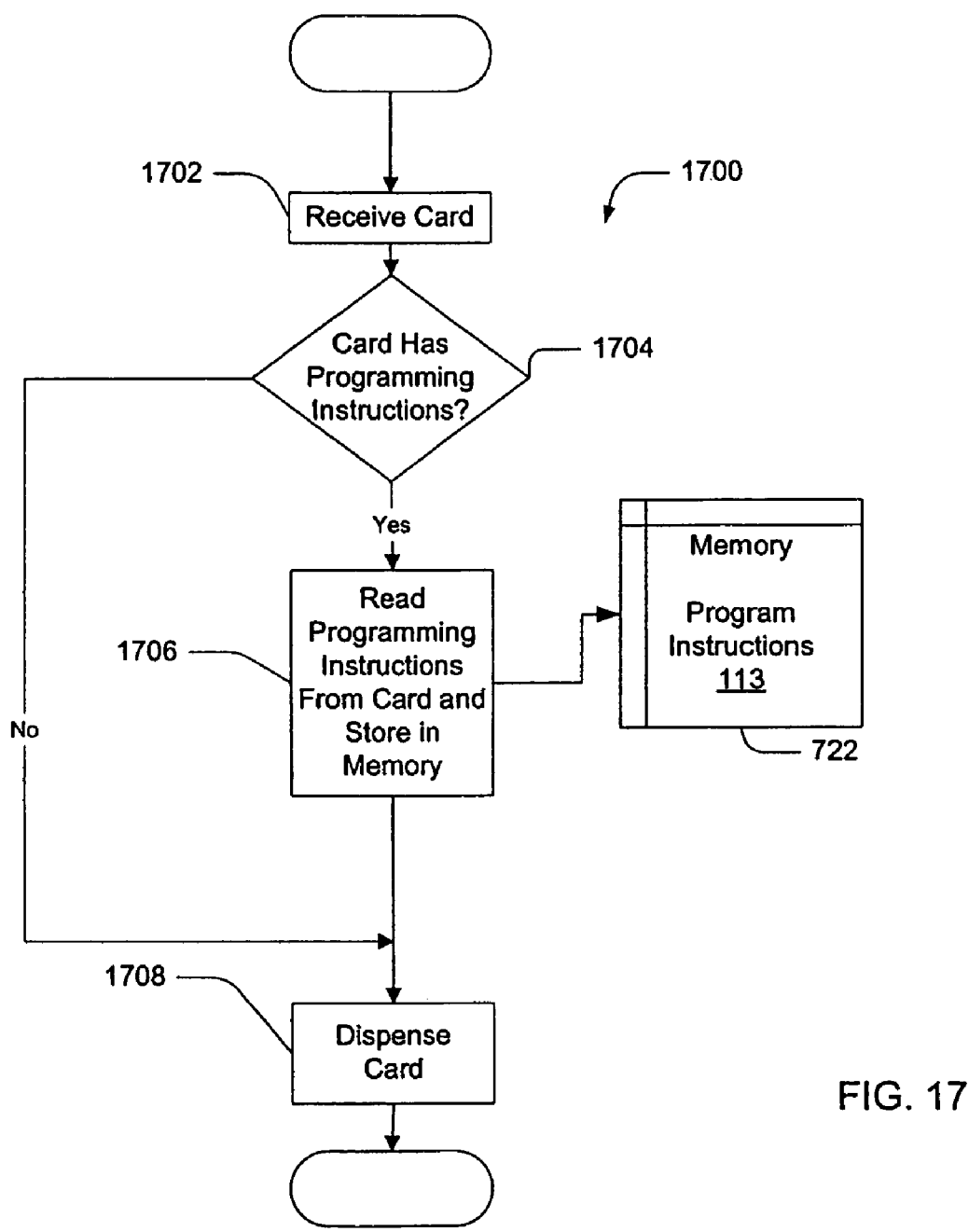
FIG. 17 is a process flow diagram of a programming process using a rewritable card in accordance with an exemplary embodiment of the present invention.

FIG. 17 is a process flow diagram of a programming process using a rewritable card in accordance with an exemplary embodiment of the present invention. A rewritable card printer may use a rewritable card to load programming instructions into memory. The rewritable card may include programming instructions in a magnetic strip readable by the rewritable card's magnetic strip read/write head, or programming instructions may be included in the printed indicia on the card and read by an optical scanning device.

In a programming process 1700, a rewritable card printer receives (1702) a card and determines (1704) if the card includes programming instructions. A rewritable card printer may make the determination by either scanning the card and parsing the information found on the card or may be signaled by an external device that the inserted card includes programming instructions. If the card does have programming instructions, the rewritable card printer reads (1706) the programming instructions and stores the programming instructions 113 in the rewritable card printer's memory 722. After reading the card, the rewritable card printer dispenses the card 724. In addition to reading rewritable cards to obtain additional programming instructions, the rewritable card printer may receive programming instructions from an external device, such as external controller 730 (of FIG. 7*a*).

Figure 18:
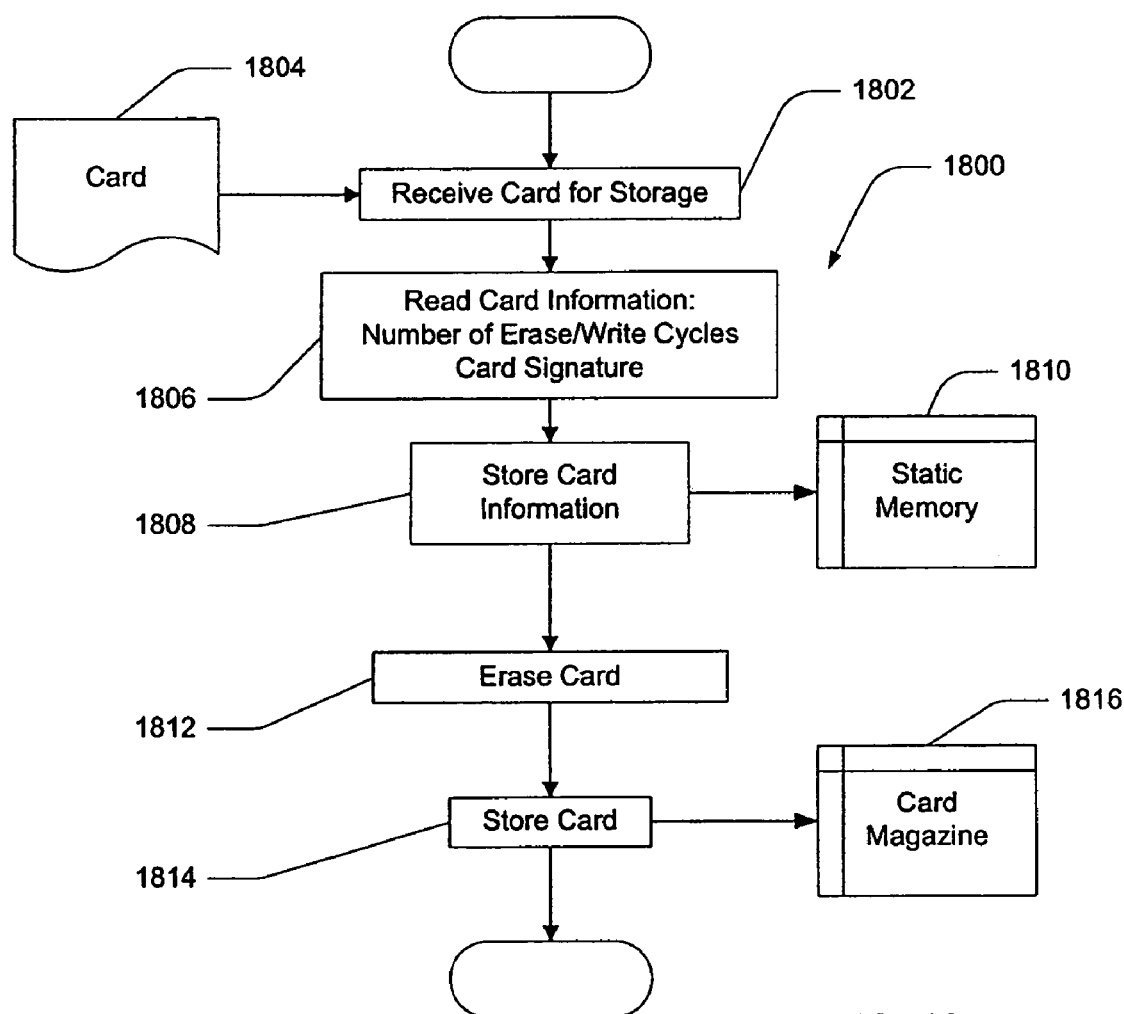
FIG. 18 is a process flow diagram of a card information storage process in accordance with an exemplary embodiment of the present invention.

FIG. 18 is a process flow diagram of a card information storage process in accordance with an exemplary embodiment of the present invention. A rewritable card printer receives (1802) a card 1804 for storage into a card magazine. The rewritable card printer reads (1806) card information from the card. The card information may include the number of erase/write cycles that the card has gone through and the unique signature of the card. The rewritable card printer stores (1808) the card information in static memory 1810. The static memory may be on the card itself, in a card magazine, or in a static memory location in the printer controller. Once the card information has been stored, the writable card printer erases (1812) the card and stores (1814) the erased card in a card magazine 1816.

Figure 19:
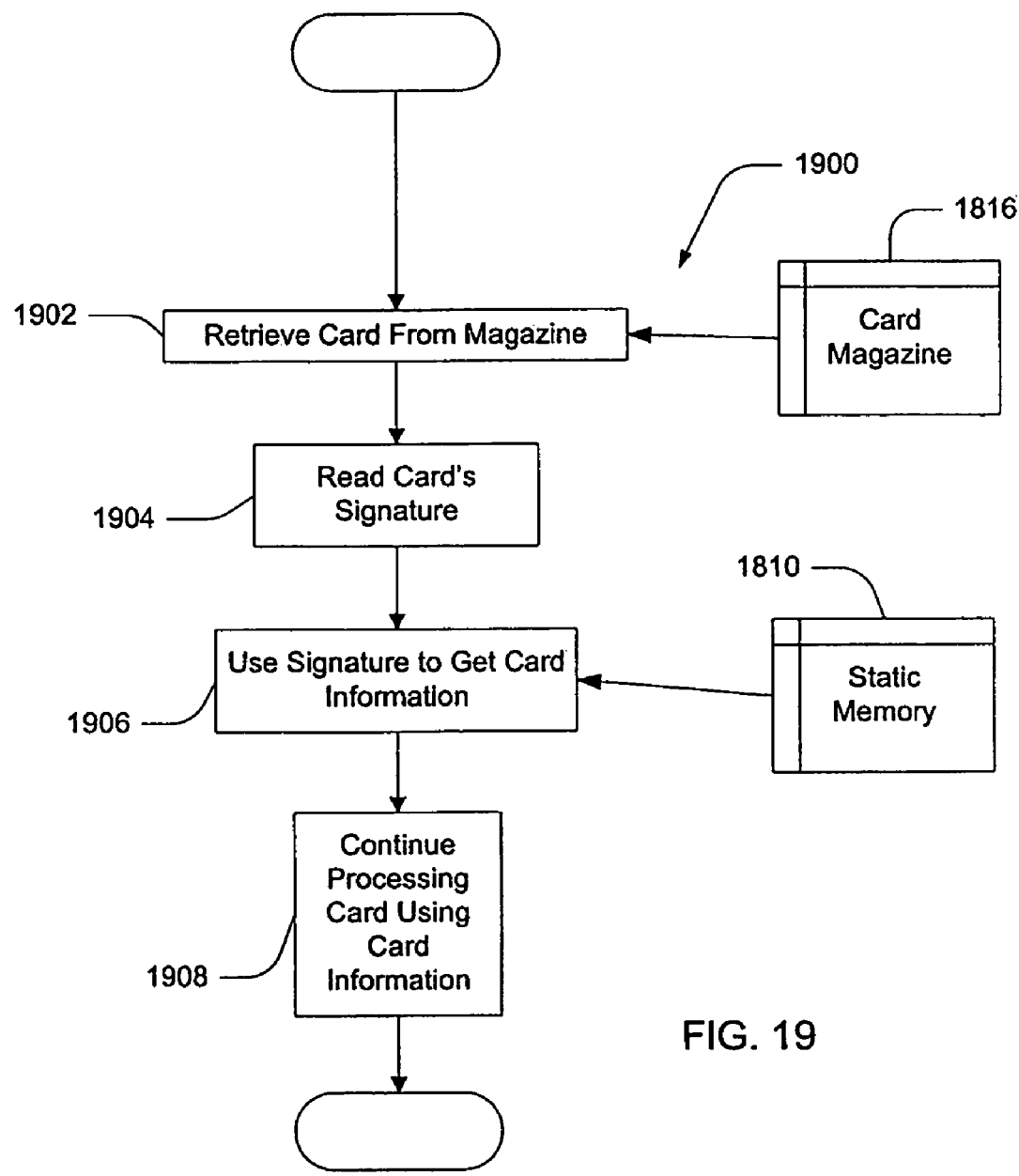
FIG. 19 is a process flow diagram of a card information retrieval process in accordance with an exemplary embodiment of the present invention.

FIG. 19 is a process flow diagram of a card information retrieval process in accordance with an exemplary embodiment of the present invention. A card retrieval process 1900 is used by a rewritable card printer to initiate writing on to an erased card. The card's information, including information about how many read/write cycles the card has gone through, is stored in static memory 1810 as previously described. This enables a rewritable card printer to safely store rewritable cards in an erased mode and still track card usage in order to determine when a card should be removed from service.

The rewritable card printer retrieves (1902) a card from a card magazine 1816. The rewritable card printer reads (1904) the cards signature and uses (1906) the card's signature to retrieve card information from the static memory. The rewritable card printer then continues (1908) processing the rewritable card using the retrieved card information. This may include incrementing the number of erase/write cycles that the card has gone through onto the card before dispensing the card. This processing may also include removing the card from service.

Figure 20:
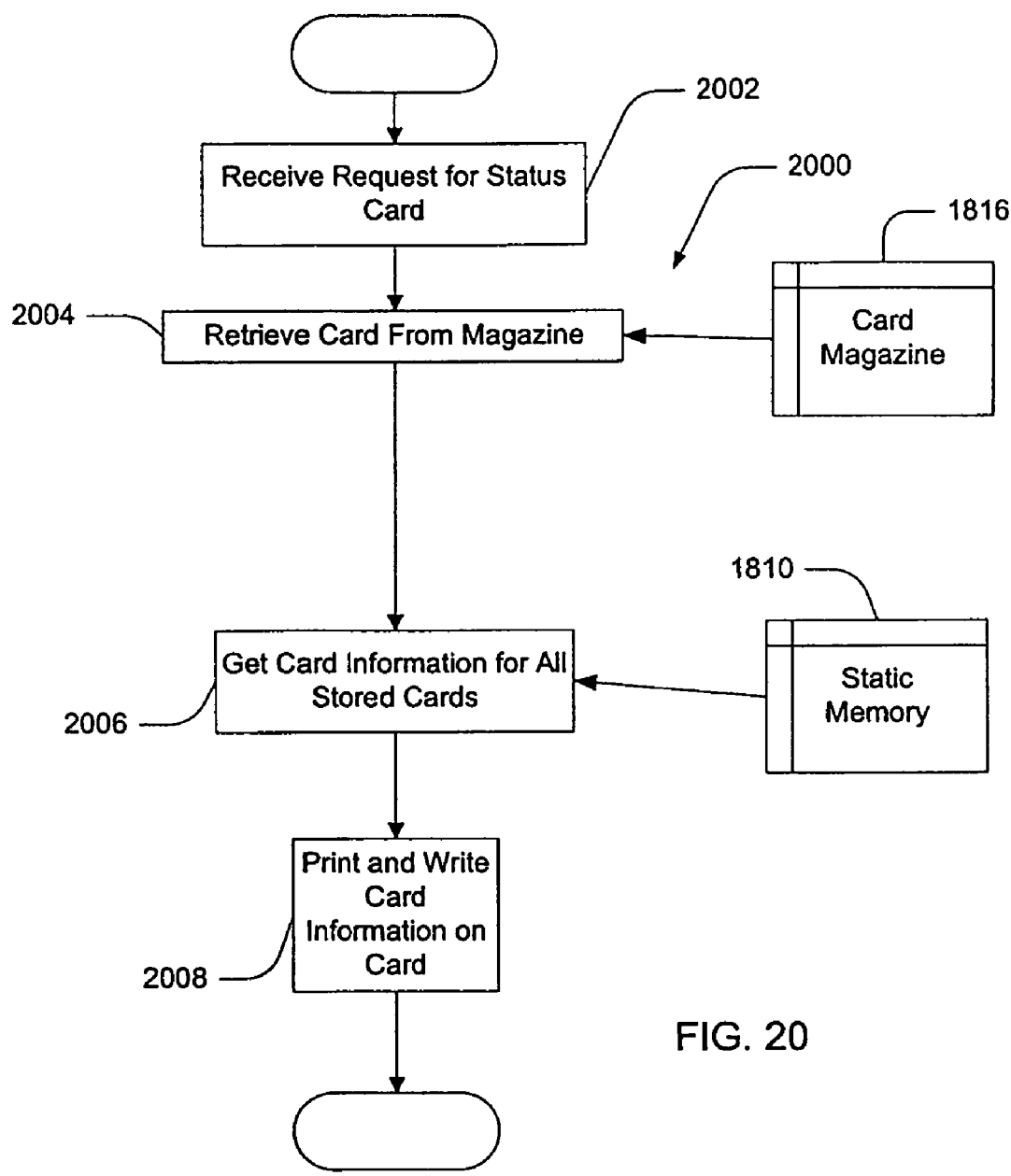
FIG. 20 is a stored card status printing process in accordance with an exemplary embodiment of the present invention.

FIG. 20 is a stored card status printing process in accordance with an exemplary embodiment of the present invention. A rewritable card printer uses a stored card status printing process 2000 to report on a rewritable card the status of the rewritable card printer, game host, and rewritable cards stored by the rewritable card printer. The rewritable card printer receives 2002 a request for printing a status card. The in response to the request, the rewritable card printer retrieves (2004) a card from the card magazine 1816. The rewritable card printer retrieves (2006) card information stored in static memory 1810 about the cards stored by the rewritable card printer. The rewritable card printer then uses the card information to generate printable indicia for printing (2008) on the card and prints the indicia on the card before dispensing it.

Figure 21:
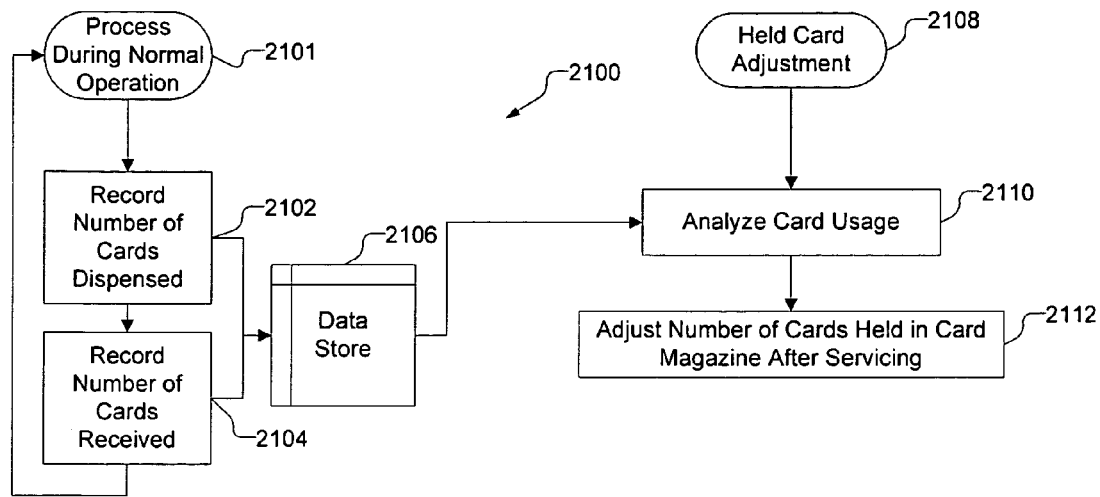
FIG. 21 is a process flow diagram of a card load balancing process in accordance with an exemplary embodiment of the present invention.

FIG. 21 is a process flow diagram of a card load balancing process in accordance with an exemplary embodiment of the present invention. In operation, a rewritable card printer collects rewriteable cards as well as dispenses them. Therefore, when a printer is placed into service, it must both contain some cards to dispense and have room in its card magazines to accept collected cards. Depending on where in a gaming establishment the rewritable card printer is placed, the rewritable card printer may dispense more cards than it receives. For example, if the rewritable card printer is in a gaming machine placed at an entrance to a gaming establishment, the rewritable card printer may dispense more cards than it receives as players entering the establishment "cash-in" by exchanging cash or other types of credits for a rewritable card. Other rewritable card printers may be located in gaming machines where a player cashes-in using a rewritable card and then exhausts their credits while playing. In this case, the player will walk away from the gaming machine without receiving another rewritable card. A rewritable card printer in this case will then collect more cards than it dispenses.

In each of the previously described cases, the time periods between servicing the printers could be increased if the amount of cards held in the card magazines controlled by printers could be adjusted. For example, for the printer that dispenses more cards than it collects, the number of cards held in the printer's card magazines could be increased so that there are more cards that could be dispensed before the magazine is exhausted. In the case of a printer that collects more cards than it dispenses, the number of cards held in the printer's card magazines after servicing could be decreased so that it could collect more cards before having to be serviced to remove the excess cards.

In a card magazine load adjustment process 2100, during normal operation of dispensing and collecting cards (2101) the printer tracks card usage by recording (2102) the number of cards dispensed and recording the number of cards received (2104) in a data store 2106. Then, either before or when being serviced (2108), the printer analyzes (2110) the number of cards dispensed and received and adjusts (2112) the desired number of cards the rewritable card printer should hold in its magazine after servicing. For example, if a printer determines that is dispensing too many cards and runs out of cards quickly, it will request more cards during servicing. In a like manner, if the printer is constantly filling up its card magazines with collected cards, the printer could dispense more cards during servicing, leaving more room in its internal card magazines for storing cards.

In another embodiment of a rewritable card printer, the desired number of cards held in the card magazine is sent to the printer via an external controller such as a game controller or card tracking controller.

In another embodiment of the present invention, the rewritable card printer receives the desired number of cards from a manual input such as a switch or other type of user interface.

In another embodiment of the present invention, rather than using the number of cards dispensed or collected, the printer monitors card usage by tracking how often the card magazines must be either replenished or emptied. For example, each time the printer is serviced to empty a magazine, the number of cards that are retained in the printer's magazines after servicing could be reduced. In a like manner, each time a printer must be serviced because its magazines are empty, the number of cards retained in the magazines after servicing could be increased.

Figure 22:
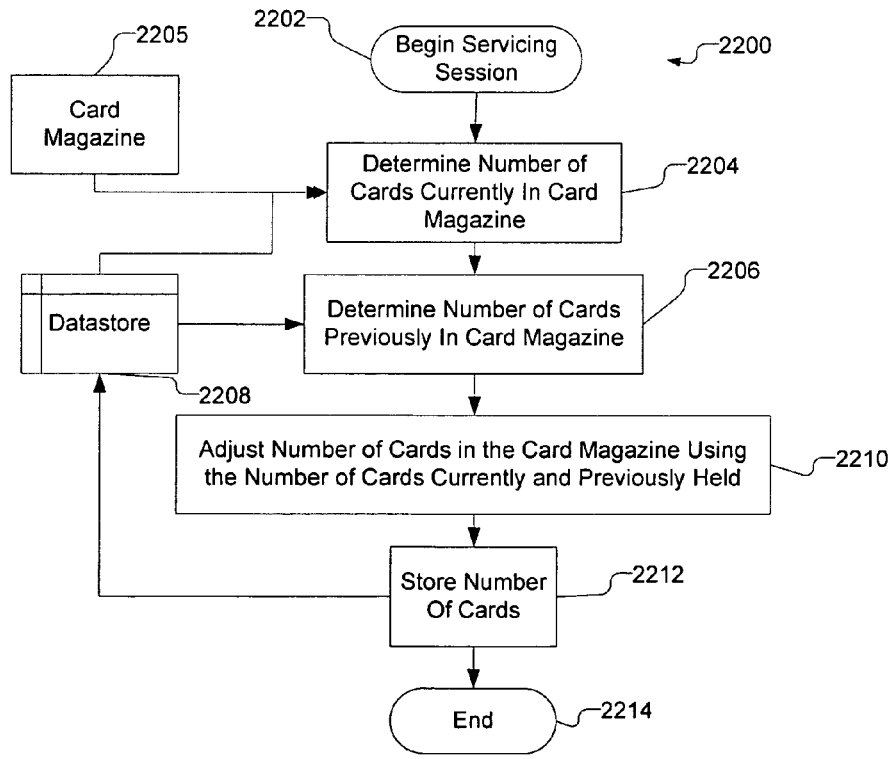
FIG. 22 is another process flow diagram of a card load balancing process in accordance with the present invention.

FIG. 22 is another process flow diagram of a card load balancing process in accordance with an exemplary embodiment of the present invention. In this process, card magazine levels are tracked in order to adjust the number of cards that are either loaded into or emptied from a printer during a servicing session of the printer. The process (2200) begins (2202) and a number of cards currently held in a card magazine is determined (2204). The determination may be made by either consulting a data store 2208 that the printer uses to track card usage or by querying the card magazine 2205 (as indicated by the dotted connectors). The process next determines (2206) the number of cards that were previously held by the card magazine after a servicing session by consulting the data store. The process then adjusts (2210) the number of cards held in the card magazine on the basis of the number of cards currently and previously held in the card magazine. The adjustment is made by either dispensing cards from the card magazine or accepting more cards to load into the card magazine. The process stores (2212) the number of cards that the card magazine holds after adjustment in the data store. The servicing session then ends (2214).

For example, if the number of cards held in the card magazine is too high, meaning the printer has accepted more cards than it has dispensed, the load balancing process adjusts the number of cards held in the card magazine so that cards are dispensed until the number of cards in the card magazine reaches a certain number of retained cards. If, on consulting the number of cards that were previously held in the card magazine after a printer servicing session, the load balancing process determines that too many cards were retained in the previous servicing session, the load balancing process may adjust the number of retained cards downwards. In a similar manner, if the number of cards currently held in the card magazine is too low, meaning the printer is dispensing more cards than it receives, the load balancing process adjusts the number of cards held in the card magazine so that cards are received until the number of cards in the card magazine reaches a certain number of retained cards. If, on consulting the number of cards that were previously held in the card magazine after a printer servicing session, the load balancing process determines that too few cards were retained in the previous servicing session, the load balancing process may adjust the number of retained cards upwards.

In another aspect of the load balancing process, the load balancing process may store the number of cards currently held in the card magazine, number of cards needed to perform an adjustment, and/or the number of cards from previous servicing sessions in the data store. This data may be recorded for a plurality of servicing sessions in order for the load balancing process to average these values over time in order to prevent short-term usage spikes from upsetting the load balancing process.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this application and the claims' equivalents rather than the foregoing description.

What is claimed is:

1. A rewritable card printer, comprising:
   a card magazine; and
   a printer controller operably coupled to the card magazine, the printer controller adapted to, during a servicing session, adjust the number of cards in the card magazine on a basis of the number of cards currently in the card magazine and a number of cards previously in the card magazine.

2. The rewritable card printer of claim 1, wherein during the servicing session, cards are loaded into the card magazine.

3. The rewritable card printer of claim 1, wherein during the servicing session, cards are emptied from the card magazine.

4. The rewritable card printer of claim 1, wherein the number of cards previously in the card magazine is determined during a previous servicing session.

5. The rewritable card printer of claim 4, wherein during the previous servicing session, cards are loaded into the card magazine.

6. The rewritable card printer of claim 4, wherein during the previous servicing session, cards are emptied from the card magazine.

7. The rewritable card printer of claim 1, the printer controller is further adapted to record an adjusted number of cards and, during a subsequent servicing session, adjust the number of cards in the card magazine further on a basis of the adjusted number of cards.

8. The rewritable card printer of claim 7, wherein the adjusted number of cards is recorded for a plurality of servicing sessions.

9. The rewritable card printer of claim 1, the printer controller further adapted to:
   record the number of cards currently in the card magazine; and
   during a subsequent servicing session, adjust the number of cards in the card magazine further on a basis of the recorded number of cards.

10. The rewritable card printer of claim 1, wherein the number of cards currently in the card magazine is recorded for a plurality of servicing sessions.

11. A method of operating a rewritable card printer, comprising, during a servicing session, adjusting the number of cards in a card magazine on a basis of the number of cards currently in the card magazine and a number of cards previously in the card magazine.

12. The method of claim 11, wherein during the servicing session, cards are loaded into the card magazine.

13. The method of claim 11, wherein during the servicing session, cards are emptied from the card magazine.

14. The method of claim 11, wherein the number of cards previously in the card magazine is determined during a previous servicing session.

15. The method of claim 14, wherein during the previous servicing session, cards are loaded into the card magazine.

16. The method of claim 14, wherein during the previous servicing session, cards are emptied from the card magazine.

17. The method of claim 11, further comprising:
   recording an adjusted number of cards, wherein during a subsequent servicing session, adjusting the number of cards in the card magazine is further on a basis of the adjusted number of cards.

18. The method of claim 17, wherein the adjusted number of cards is recorded for a plurality of servicing sessions.

19. The rewritable card printer of claim 11, the method further comprising:
   recording the number of cards currently in the card magazine; and
   during a subsequent servicing session, adjusting the number of cards in the card magazine further on a basis of the recorded number of cards.

20. The method of claim 19, wherein the number of cards currently in the card magazine is recorded for a plurality of servicing sessions.

21. A rewritable card printer, comprising:
   a card magazine; and
   a printer controller operably coupled to the card magazine, the printer controller adapted to adjust a number of cards held in the card magazine on the basis of card usage by the rewritable card printer.

* * * * *